(12) United States Patent
Takeuchi et al.

(10) Patent No.: US 6,389,877 B1
(45) Date of Patent: May 21, 2002

(54) DOUBLE-HEADED MASS SENSOR AND MASS DETECTION METHOD

(75) Inventors: Yukihisa Takeuchi, Nishikamo-gun; Takao Ohnishi, Nishikasugai-gun; Koji Kimura, Nagoya, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/367,294
(22) PCT Filed: Sep. 4, 1998
(86) PCT No.: PCT/JP98/03970
§ 371 Date: Aug. 10, 1999
§ 102(e) Date: Aug. 10, 1999
(87) PCT Pub. No.: WO99/34176
PCT Pub. Date: Jul. 8, 1999

(30) Foreign Application Priority Data

Dec. 26, 1997 (JP) .............................. 9-361369

(51) Int. Cl.⁷ .............................................. G01N 11/00
(52) U.S. Cl. .................... 73/19.03; 73/24.06; 73/31.05; 73/32 A; 73/54.41; 73/61.75; 73/61.79; 73/64.53; 73/504.12; 73/504.16
(58) Field of Search ............................. 73/19.03, 24.01, 73/24.06, 29.05, 30.04, 31.05, 31.06, 32 A, 54.23, 54.24, 54.25, 54.27, 54.38, 54.41, 61.49, 61.61, 61.75, 61.79, 64.42, 64.53, 651, 504.04, 504.09, 504.12, 504.15, 504.16

(56) References Cited

U.S. PATENT DOCUMENTS

| | | | |
|---|---|---|---|
| 4,602,505 A | * | 7/1986 | Kanda et al. ................... 75/54 |
| 4,724,351 A | | 2/1988 | EerNisse et al. |
| 4,729,237 A | * | 3/1988 | Suzuki et al. .................. 73/54 |
| 4,789,804 A | | 12/1988 | Karube et al. |
| 6,065,339 A | * | 5/2000 | Takeuchi et al. ......... 73/504.12 |
| 6,119,518 A | * | 9/2000 | Itou et al. ................ 73/504.16 |

FOREIGN PATENT DOCUMENTS

| | | |
|---|---|---|
| EP | 0 614 087 A2 | 9/1994 |
| FR | 2 739 190 | 3/1997 |
| JP | 61-231419 A | 10/1986 |
| JP | 62-64934 A | 3/1987 |
| JP | 63-200028 A | 8/1988 |
| WO | WO 97/37195 | 10/1997 |

* cited by examiner

Primary Examiner—Hezron Williams
Assistant Examiner—Rose M. Miller
(74) Attorney, Agent, or Firm—Burr & Brown

(57) ABSTRACT

There is provided a double-headed mass sensor (25) in which between a first connecting plate (22A) joined to a first diaphragm (21A) at respective sides and a second connecting plate (22B) joined to a second diaphragm (21B) at respective sides, a first sensing plate (41A), on which a main element (44) is provided on at least one plane surface, is bridged, and a resonating portion comprising the diaphragms (21A), (21B), the connecting plates (22A), (22B), the first sensing plate (41A) and the main element (44) is joined to a sensor substrate (27). Change in the mass of each of the diaphragms (21A), (21B) is measured by measuring change in the resonant frequency of the resonating portion accompanying the change in the mass of the diaphragms (21A), (21B). The mass sensor of the present invention enables the easy and highly accurate measurement of a minute mass of a nanogram order including microorganisms such as bacteria and viruses, chemical substances, and the thickness of vapor-deposited films.

21 Claims, 16 Drawing Sheets

FIG. 9
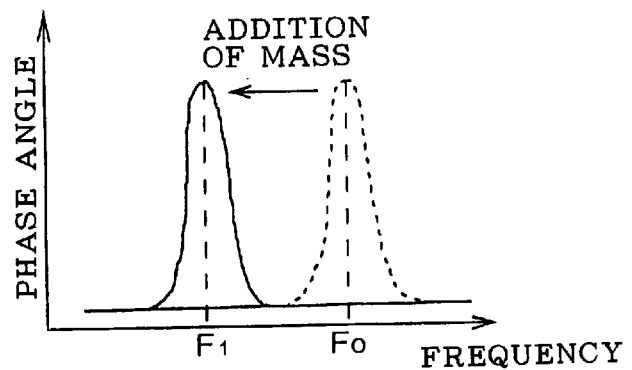
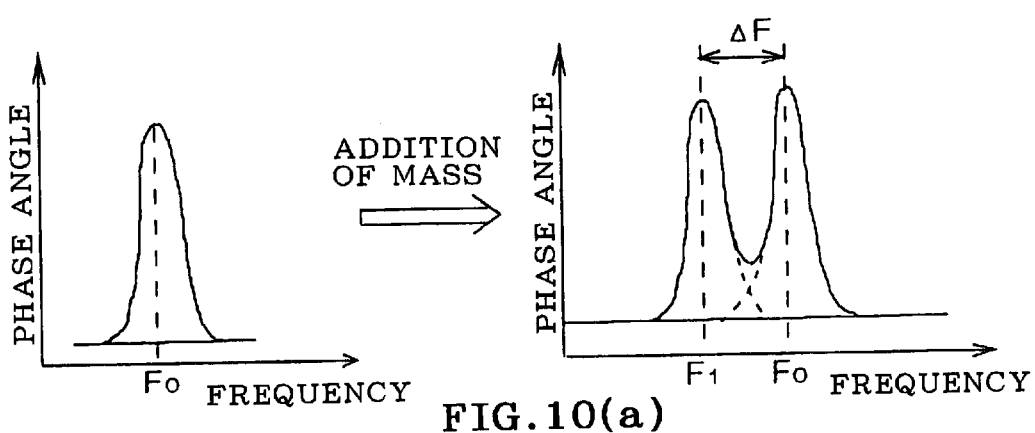
FIG. 10(a)
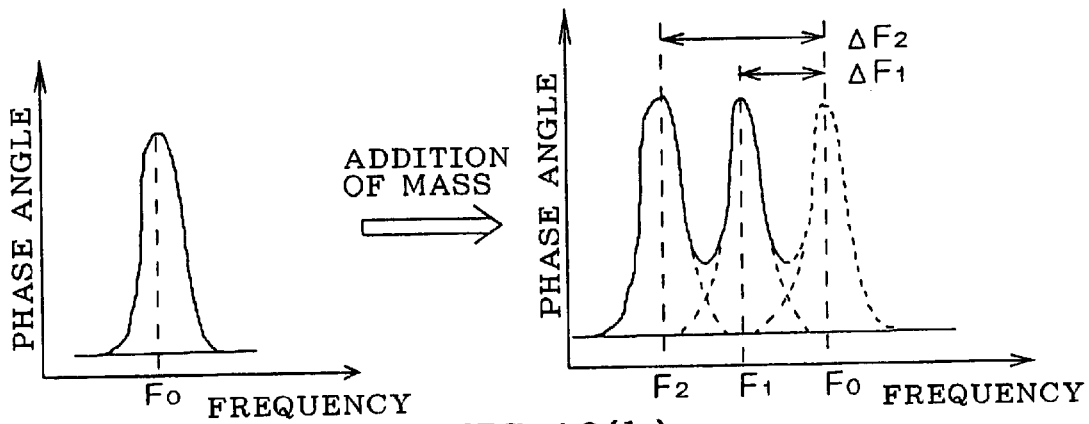
FIG. 10(b)

FIG. 22 - Prior Art
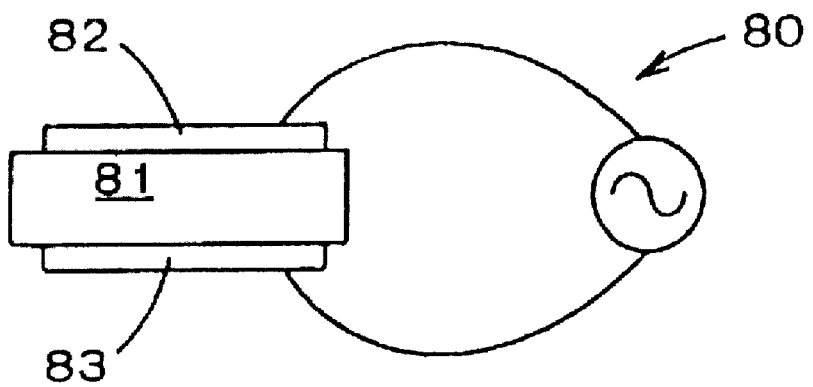
FIG. 23 - Prior Art
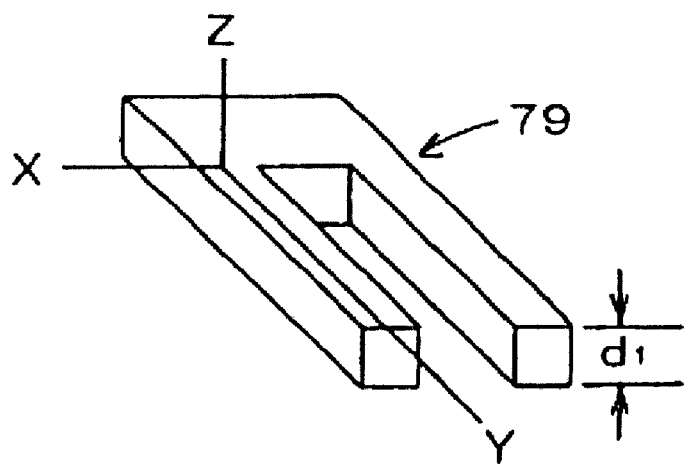

FIG.24 - Prior Art
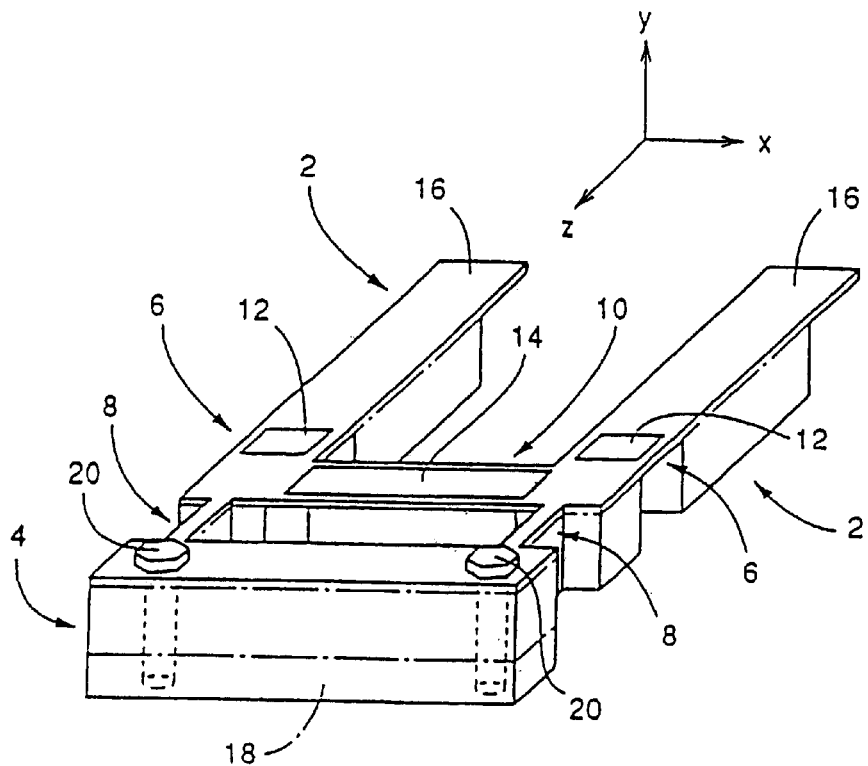
FIG.25 - Prior Art
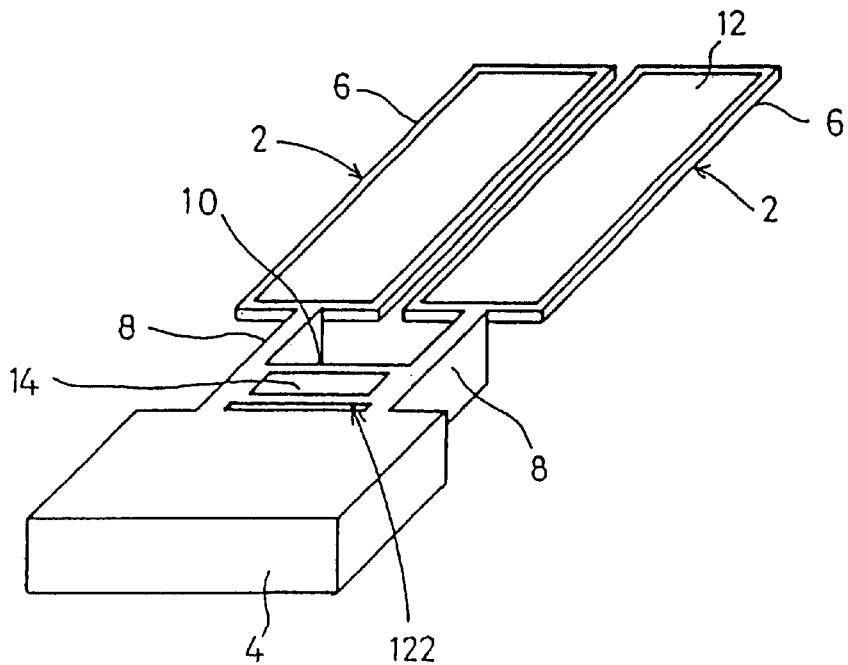

DOUBLE-HEADED MASS SENSOR AND MASS DETECTION METHOD

TECHNICAL FIELD

The present invention relates to a double-headed mass sensor for determining a minute mass of a nanogram ($10^{-9}$g) order, for example, a mass sensor for sensing microorganisms such as bacteria, viruses, and protozoa or the like (immune sensor), and a mass sensor for sensing moisture, toxic substances, or specific chemical substances such as taste components (moisture meter, gas sensor, and taste sensor), and a method for sensing a mass.

In the present invention, two diaphragms used look like and function as "two heads", the mass sensor of the present invention has been named a double-headed mass sensor.

The double-headed mass sensor of the present invention can sense change in the mass of a diaphragm by measuring a change in resonant frequencies caused by attaching a specific material on a diaphragm, and it is possible to sense change in resonance frequency due to change in the mass of the diaphragm itself; and therefore, the mass sensor can also be used as a thickness meter for vapor-deposited films or a dew indicator.

Furthermore, even if the mass of the diaphragm is not changed, the double-headed mass sensor of the present invention can also be used as a vacuum gauge, a viscosity meter, or a temperature sensor by placing it in an environment to cause change in resonant frequency, that is, by placing it in a medium environment of gases or liquids having different degree of vacuum, viscosity, or temperature.

Thus, although the double-headed mass sensor of the present invention can be used in various applications depending on its embodiments, the same basic principle is applied to the measurement of change in resonant frequencies of the diaphragm and the resonating portion including the diaphragm.

The double-headed mass sensor will be described below focusing on the case where it is used as an immunosensor.

BACKGROUND ART

Among what are referred to as diseases, microbiological examinations are recently essential for the treatment of diseases caused by microorganisms such as bacteria, viruses, or protozoa, to find their pathogens, to clarify their types, and to determine drugs to which they are sensitive.

At present, in the first stage of the microbiological examinations, since the cause of a disease and the type of the pathogen can be estimated from the symptoms, various specimens are selected depending on the type of the disease, pathogens present in the specimens are morphologically identified, or antigens or specific metabolites of pathogens (e.g., toxins or enzymes) existing in the specimens are immunochemically identified. Such processes include smeartests, staining, or microscopy used in bacterioscopy, and in recent years, instantaneous identification has become possible in this stage by fluorescent antibody staining or enzymatic antibody staining.

Also, the virus serological test, used in the detection of viruses, is a method for proving the presence of specific immune bodies (antibodies) that appear in the serum of a patient. For example, a complement fixation reaction is used in which the presence of antibodies or antigens is determined by adding complements to test blood, and by observing whether the complements react with antigens or antibodies in the blood and fix to the cell membranes of the antigens or antibodies, or destroy the cell membranes.

In the treatment of diseases caused by microorganisms or the like, as described above, adequate treatment can be conducted by finding pathogens in an early stage through the microbiological examinations described above, and the patient can be led to recovery without worsening of the condition of a disease.

However, with methods such as smeartests, staining, and microscopy, the detection of microorganisms is often difficult depending on their quantities, and time-consuming treatment such as the culture of specimens on an agar medium must be conducted as required. Also in the virus serological test, since measurements must usually be performed during both the acute stage and the convalescent stage for determination from the changes in the quantities of antibodies, there is the problem of time consumption from the point of view of prompt diagnosis.

Therefore, as seen in complement fixation reactions described above, when a substance to be sensed reacts with a catching substance which catches the substance to be sensed by reacting only with a specific substance to be sensed, microorganisms, the mass of the catching substance increases by the mass of the substance to be sensed, even slightly, and considering such a fact, the detection of pathogens is considered to be possible by the measurement of such a change in the mass. Such an increase in the mass similarly occurs in the relationship between a catching substance and a chemical substance such as a specific gaseous substance and a smell component, and also applies to the case where a substrate itself without change in the mass is a catching substance, on which a specific substance is deposited or added. On the contrary, when a reaction in which a substance to be sensed caught by a catching substance or the like is released, the mass of the catching substance or the like slightly decreases.

As an example of a method for sensing change in such a small mass, U.S. Pat. No. 4,789,804 discloses in FIG. 22 thereof a mass sensor 80 comprising a quartz oscillator 81 and electrodes 82, 83 facing the quartz oscillator 81. When any substance adheres externally on these electrodes 82, 83, the mass sensor 80 senses change in mass using change in the resonant frequency of the thickness slip oscillation (shear mode) of the quartz oscillator 81 in the direction of the surface of the electrodes. Since such a mass sensor 80 measures change in resonant frequency basically caused by change in the mass load on the quartz oscillator 81, such a mass sensor 80 is considered to be able to be used also as a thickness meter for measuring the thickness or the growth of a vapor-deposited film, or a moisture meter.

However, when such a quartz oscillator 81 is used, since the part on which an external substance adheres and the part for detecting resonant frequency are in the same location, for example, the resonant frequency becomes unstable because piezoelectric properties of the quartz oscillator 81 itself vary due to the temperature of the specimen or change in temperature. Also, if the specimen is a conductive solution, when the mass sensor 80 is immersed unprotected in the specimen, a short-circuit between electrodes 82, 83 may occur. Therefore, the mass sensor 80 must always be subjected to insulation such as resin coating.

Furthermore, various vibratory gyro sensors are disclosed in International Patent Application JP97/01094 in accordance with the Patent Cooperation Treaty, and their structures resemble the double-headed mass sensor of the present invention described below in appearance. Differences between such vibratory gyro sensor and the double-headed mass sensor of the present invention will be compared in the description of the embodiments of the double-headed mass sensor of the present invention.

DISCLOSURE OF THE INVENTION

The present invention aims to improve the properties of the mass sensor as described above.

According to the present invention, there is provided as a first double-headed mass sensor, a double-headed mass sensor characterized in that between a first connecting plate joined to a first diaphragm at respective sides and a second connecting plate joined to a second diaphragm at respective sides, a resonating portion comprising the first connecting plate, the second connecting plate, the first diaphragm, the second diaphragm, and a first sensing plate, and a main element being provided on at least one plane surface of the first sensing plate, bridged in the direction perpendicular to the joining direction of each of said connecting plates and each of said diaphragms, is joined to a sensor substrate at at least a part of sides of said first connecting plate and said second connecting plate.

Here, the main element is preferably split in the direction perpendicular to the joining direction of the first sensing plates and each of the connecting plates.

A part of sides of the first connecting plate joined to the sensor substrate means more specifically the sides of the first connecting plate is a face that opposites to the joining surface with the first diaphragm, and this is the same for the second connecting plate. That is, the diaphragms are joined to the sensor substrate via respective connecting plates. Such a mode of joining between each of the connecting plates and the sensor substrate is common to the double-headed mass sensor of the present invention to be described below. Also in the first double-headed mass sensor, the first sensing plate may be joined to the sensor substrate, or, a gap may be provided between the first sensing plate and the sensor substrate. Such a mode of providing the first sensing plate is similarly applied to every sensing plate in other double-headed mass sensors described below.

Also according to the present invention, there is provided as a second double-headed mass sensor, a double-headed mass sensor characterized in that a first connecting plate is joined to a first diaphragm and a second connecting plate is joined to a second diaphragm at respective sides, said first connecting plate is positioned between a first sensing plate and a second sensing plate, said second connecting plate is positioned between said first sensing plate and a third sensing plate, so that the respective sides are joined to each other, and a resonating portion comprising the first connecting plate, the first diaphragm, the second connecting plate, the second diaphragm, the first sensing plate, the second sensing plate, the third sensing plate, a main element provided on a part of at least one plane surface of said first sensing plate, and/or a subsidiary element provided on at least a part of the plane surface of at least one of said second sensing plate and said third sensing plate, is joined to a sensor substrate at at least a part of sides of said respective connecting plates.

Here, the main element and/or subsidiary element may be split in the direction perpendicular to the joining direction of each of the sensing plates and each of the connecting plates.

In both the first and second double-headed mass sensors, there is preferably adopted the structure in which the direction of the extension of the center line equally dividing the plane surface of the first sensing plate and perpendicular to the joining direction of the first sensing plate and each of the connecting plates is parallel to the joining direction of the first connecting plate and said first diaphragm, and the joining direction of the second connecting plate and the second diaphragm, and the resonating portion has a shape symmetrical about the center line. When the double-headed mass sensor is immersed in electrically conductive solution in use, an each diaphragm is immersed in the electrically conductive solution. In order that the main element or subsidiary element is not immersed in the electrically conductive solution, it is preferable to provide a position sensor consisting of a pair of electrodes on said sensor substrate at the central position between each of said diaphragms and said main element.

Furthermore, according to the present invention, there is provided as a third double-headed mass sensor, a double-headed mass sensor characterized in that a side of each diaphragm is joined to a side of each connecting plate so that a first diaphragm is sandwiched between a first connecting plate and a second connecting plate, and a second diaphragm is sandwiched between a third connecting plate and a fourth connecting plate; a first sensing plate is bridged across said first connecting plate and said third connecting plate, and a second sensing plate is bridged across said second connecting plate and said fourth connecting plate; and a resonating portion comprising the first connecting plate, the first diaphragm, the second connecting plate, the second diaphragm, the third connecting plate, the fourth connecting plate, the first sensing plate, the second sensing plate, and a main element provided on at least one plane surface of each of said sensing plates, is bridged across the gap between the sides of a sensor substrate facing to each other joining at least a part of the side of each of said connecting plates to the sides of the sensor substrate.

Here, the main element may preferably be split in the direction perpendicular to the joining direction of each of the sensing plates and each of the connecting plates.

Moreover, according to the present invention, there is provided as a fourth double-headed mass sensor, a double-headed mass sensor characterized in that a side of each diaphragm is joined to a side of each connecting plate so that the first diaphragm is sandwiched between a first connecting plate and a second connecting plate, and the second diaphragm is sandwiched between a third connecting plate and a fourth connecting plate; each of said connecting plates is joined at the respective sides so that said first connecting plate is positioned between a first sensing plate and a third sensing plate, said third connecting plate is positioned between said first sensing plate and a fourth sensing plate, said second connecting plate is positioned between a second sensing plate and a fifth sensing plate, and said fourth connecting plate is positioned between said second sensing plate and a sixth sensing plate; a resonating portion comprising the first connecting plate, the first diaphragm, the second connecting plate, the second diaphragm, the third connecting plate, the fourth connecting plate, the first sensing plate, the second sensing plate, the third sensing plate, the fourth sensing plate, the fifth sensing plate, the sixth sensing plate, main elements provided on at least a part of at least one plane surface of said first sensing plate and said second sensing plate, and/or subsidiary elements provided on at least a part of at least one plane surface of one or more of said third sensing plate, said fourth sensing plate, said fifth sensing plate, and said sixth sensing plate, is bridged across the gap between the sides of a sensor substrate facing to each other joining at least a part of the side of each of said connecting plates to the sides of the sensor substrate.

Here, it is also preferable that each of the main elements and/or each of the subsidiary elements are split in the direction perpendicular to the joining direction of each of the sensing plates and each of the connecting plates.

In the above third and fourth double-headed mass sensors, it is preferable that the center line equally dividing the plane surface of the first sensing plate and perpendicular to the joining direction of the first sensing plate to the first connecting plate and the third connecting plate coincides with the center line equally dividing the plane surface of the second sensing plate and perpendicular to the joining direction of the second sensing plate to the second connecting plate and the fourth connecting plate; the direction of the extension of the center line is parallel to the direction where the first connecting plate and the second connecting plate sandwich the first diaphragm, and the direction where the third connecting plate and the fourth connecting plate sandwich the second diaphragm; and the resonating portion is constituted to have a shape symmetrical about each of the center line, and the line orthogonal to the center line and passing through the centers of the first diaphragm and the second diaphragm.

Furthermore, in all of the first to fourth double-headed mass sensors, a piezoelectric element consisting of a first electrode, a second electrode, and a piezoelectric film is preferably used as each of the main elements and/or each of the subsidiary elements, and as the structure thereof, a laminated structure in which the piezoelectric film is sandwiched between the first electrode and the second electrode, or a structure in which a comb-shaped electrode consisting of the first electrode and the second electrode facing to each other on the plane surface of the piezoelectric film or between the piezoelectric film and a sensing plate on which the piezoelectric film is provided, or a structure in which the piezoelectric film is provided in the gap between the first electrode and the second electrode forming the comb-shaped electrode, is preferably adopted. When a subsidiary element is provided, it is preferable that the direction of polarization of the piezoelectric film in each of the main elements is opposite to the direction of polarization of the piezoelectric film in each of the subsidiary elements. As the material for the piezoelectric film, a material consisting mainly of lead zirconate, lead titanate, and lead magnesium niobate is preferably used. It is also preferable that the available electrode area of the piezoelectric element is adjusted by removing a part of the first electrode and/or the second electrode with laser processing or machining.

The term "piezoelectric" used herein includes piezoelectricity and electrostrictivity, and for example, piezoelectric ceramics include electrostrictive ceramics.

Furthermore it is preferable that each of the diaphragms, each of the connecting plates, and each of the sensing plates form the same plane surface through joining to each other, and that each of the sensing plates is fitted in and joined to the concave portion formed by each of the connecting plates and the sensor substrate. For this purpose, it is preferable that each of the diaphragms, each of the connecting plates, and each of the sensing plates are integrally formed from a vibration plate, and the sensor substrate is integrally formed by laminating the vibration plate and a base plate.

In addition to the above, it is preferable that spring plates are joined on a plane surface in the same direction of each of the connecting plates, or on both plane surfaces of each of the connecting plates, and each of the spring plates is joined to the sensor substrate or a spring plate reinforcing member. Here, it is preferable for improving mechanical reliability and temperature properties that each of the spring plates is integrally formed with an intermediate plate which is integrally formed between the diaphragm and the base plate, or integrally formed with the spring plate reinforcing member integral with the diaphragm, and formed also integrally with each of the connecting plates, and that each of them is made to have a structure not adhered with adhesives or the like. Furthermore, when such spring plates are provided, the structure comprising a reinforcing plate adhered to each of the spring plates, and joined to the sensor substrate is also preferably adopted. Such a reinforcing plate is also preferably formed integrally with each of the spring plates and the sensor substrate.

Also, by applying a catching substance, which reacts only with a substance to be sensed and catches the substance to be sensed, to the surface of at least one of the first diaphragm and the second diaphragm, or to at least a part of the surface of the resonating portion, the mass sensor can be preferably used, for example, as an immunosensor. Here, if electrode leads electrically connected to each of the main elements and/or each of the subsidiary elements, and electrodes forming each of the main elements and/or each of the subsidiary elements are insulated by an insulation coating layer consisting of a resin or glass, the mass sensor can be used in an electrically conductive solution without hindrance. Further, as the insulation coating material, the resin is more preferable than glass, and in particular, a fluorocarbon resin or a silicone resin is suitably used. Moreover, it is preferable for minimizing noise such as external electromagnetic waves, that at least a part of the surface of the insulation coating layer is coated by a shield layer consisting of a conductive material.

Further, stabilized zirconia or partially stabilized zirconia is suitably used as a material for each of the sensor substrates, each of the diaphragms, each of the connecting plates, each of the sensing plates, each of the spring plates, and the spring plate reinforcing member and the reinforcing plate, and it is preferable that the shapes of any of each of the diaphragms, each of the connecting plates, each of the sensing plates, and each of the spring plates are dimensionally adjusted by trimming with laser processing or machining.

Next, according to the present invention, there is provided a method for sensing a mass with a double-headed mass sensor in which connecting plates are joined to each of two diaphragms at respective sides, and a sensing plate on which a main element or a subsidiary element is provided as required bridges between said connecting plates, or sandwiches said connecting plates, and at least a part of the side of said connecting plate is joined to a sensor substrate, characterized in measuring with said element the resonant frequency of the resonating portion of said double-headed mass sensor on the basis of at least either one of: the bending-mode oscillation(vibration) in which said diaphragm, making the face where said connecting plate is joined to said sensor substrate the fixed face, bends in the direction perpendicular to a vertical axis passing through the center of said fixed face vertically, and in the direction perpendicular to the plane surface of said diaphragm; the axial rotation-mode oscillation (vibration) in which said diaphragm makes rotational oscillation (vibration) around said vertical axis making said vertical axis the central axis; the θ-mode swing oscillation (vibration) in which said diaphragm makes pendulum-like oscillation (vibration) centered on said vertical axis in the direction perpendicular to the side of said diaphragm and also perpendicular to said vertical axis; or the φ-mode swing oscillation (vibration) in which said diaphragm makes pendulum-like oscillation (vibration) centered on said vertical axis with the swing in the direction perpendicular to the side of said diaphragm and also perpendicular to said vertical axis accompanied by the swing in the direction parallel to the side of said diaphragm.

Such a method for sensing a mass with a double-headed mass sensor is preferably adopted as a method for sensing a mass using the first and second double-headed mass sensors described above.

Furthermore, according to the present invention, there is provided a method for sensing a mass with a double-headed mass sensor in which each of two diaphragms is joined so as to be sandwiched by connecting plates at respective sides, a sensing plate on which a main element or a subsidiary element is provided as required bridges between said connecting plates, or sandwiches said connecting plates, and at least a part of the side of said connecting plate is joined to the sides facing to each other across the gap (or space) in the sensor substrate, characterized in measuring with said element the resonant frequency of the resonating portion of said double-headed mass sensor on the basis of either one of: the axial rotation-mode oscillation (vibration) in which said diaphragm, making the face where said connecting plate is joined to said sensor substrate the fixed face, makes rotational oscillation (vibration) around said vertical axis passing through the center of said fixed face vertically while making said vertical axis the central axis; the η-mode surface rotational oscillation (vibration) in which said diaphragm makes rotational oscillation (vibration) around the center of said diaphragm in the plane surface of said diaphragm; the φ-mode swing oscillation (vibration) in which said diaphragm makes pendulum-like oscillation (vibration) centered on said vertical axis with the swing in the direction perpendicular to the side of said diaphragm and also perpendicular to said vertical axis accompanied by the swing in the direction parallel to the side of said diaphragm; or the monoaxial-mode reciprocal oscillation (vibration) in which said diaphragm oscillates (vibrates) reciprocally in the plane surface of said diaphragm in the direction orthogonal to said vertical axis.

Such a method for sensing a mass with a double-headed mass sensor is preferably adopted as a method for sensing a mass using the third and fourth double-headed mass sensors described above.

In the two methods for sensing a mass with a double-headed mass sensor, the method in which by obtaining difference between two resonant frequencies produced by the fact that the masses of one diaphragm and the connecting plate joined to the diaphragm do not change, and the masses of the other diaphragm and the connecting plate joined to the other diaphragm change, change in the masses of the other diaphragm and the connecting plate joined to the other diaphragm is sensed, is preferably adopted.

As described above, the double-headed mass sensor of the present invention has features that change in a minute mass occurring in the resonating portion can be known exactly and quickly from a concrete value of change in the resonant frequencies of the resonating portion, the measuring operation is easy, and the measuring accuracy is high.

In addition, the double-headed mass sensor can measure various physical values by placing it in the environment where resonance frequency of the resonating portion including the diaphragms is changed. For example, it can be employed in a thickness meter for vapor-deposited films and a dew indicator utilizing direct changes in the mass of a diaphragm; and a vacuum gauge, a viscosity meter, and a temperature sensor utilizing the environment in which the sensor is placed, such as the degree of vacuum, viscosity, or temperature; and especially, it can be preferably employed to detect the presence of a substance to be sensed and to measure the mass of the substance by applying a catching substance that reacts specifically with the substance to be sensed, such as microorganisms, chemical substances, or the like in specimens and utilizing changes in its mass.

BRIEF DESCRIPTION OF THE DRAWINGS

FIG. 9 is an explanatory diagram showing a form of change in resonant frequencies when a double-headed mass sensor of the present invention is used;

FIGS. 10(a) and 10(b) are explanatory diagrams; and showing another form of change in resonant frequencies when a double-headed mass sensor of the present invention is used;

Figure 12A:
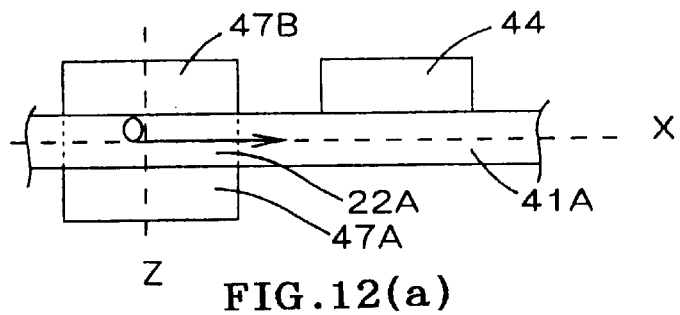
Figure 12B:
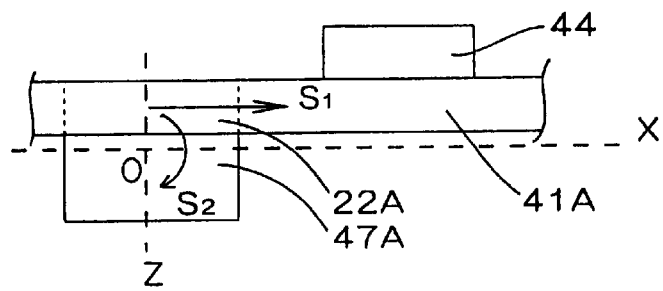
Figure 13A:
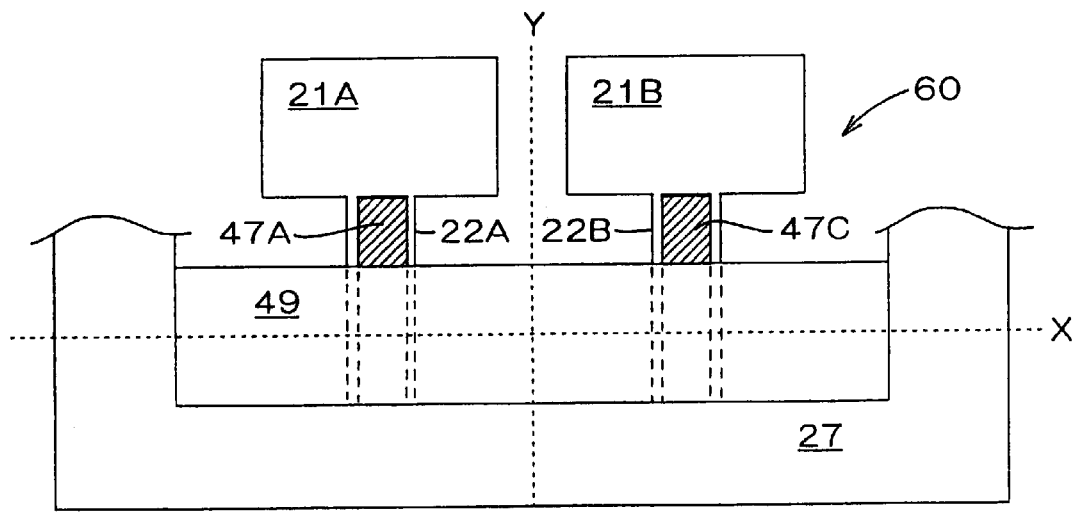
Figure 13B:
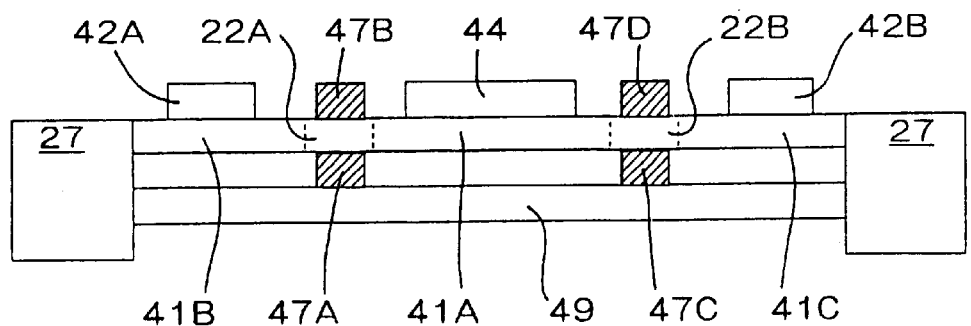
Figure 14:
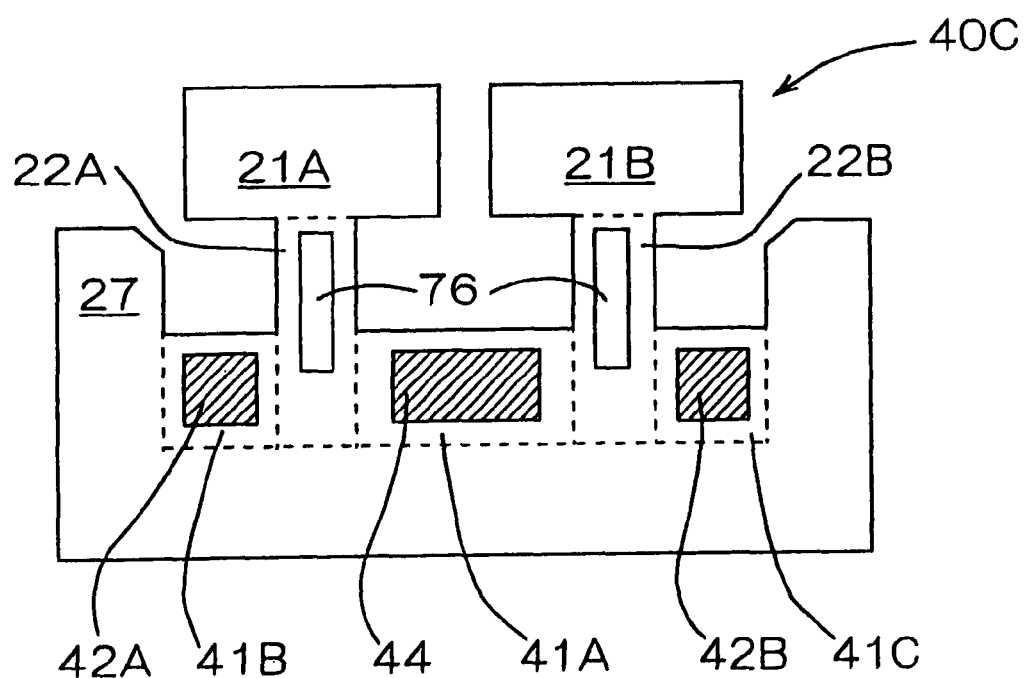
Figure 16:
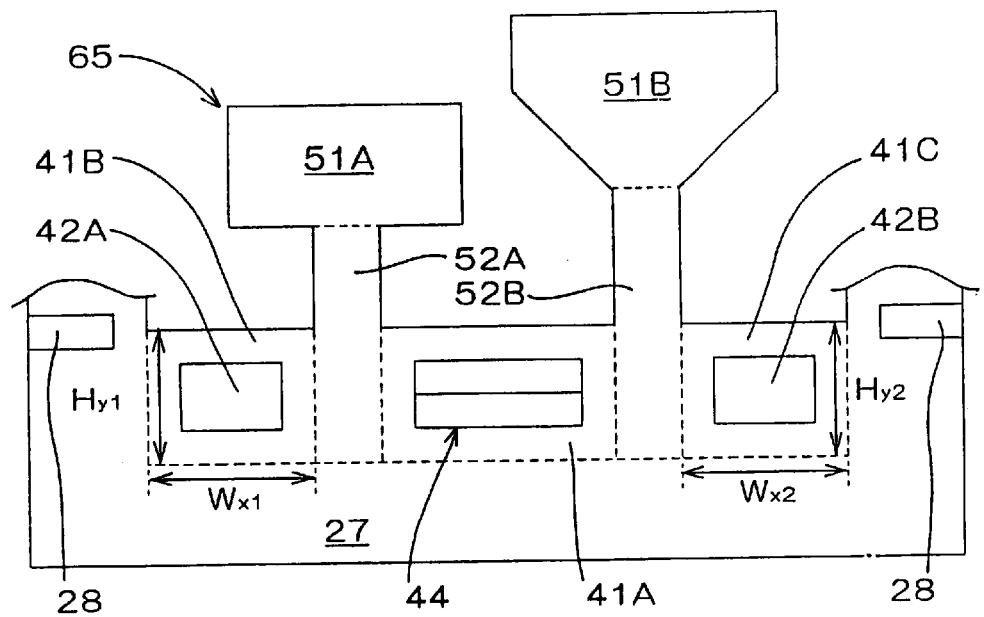
Figure 17:
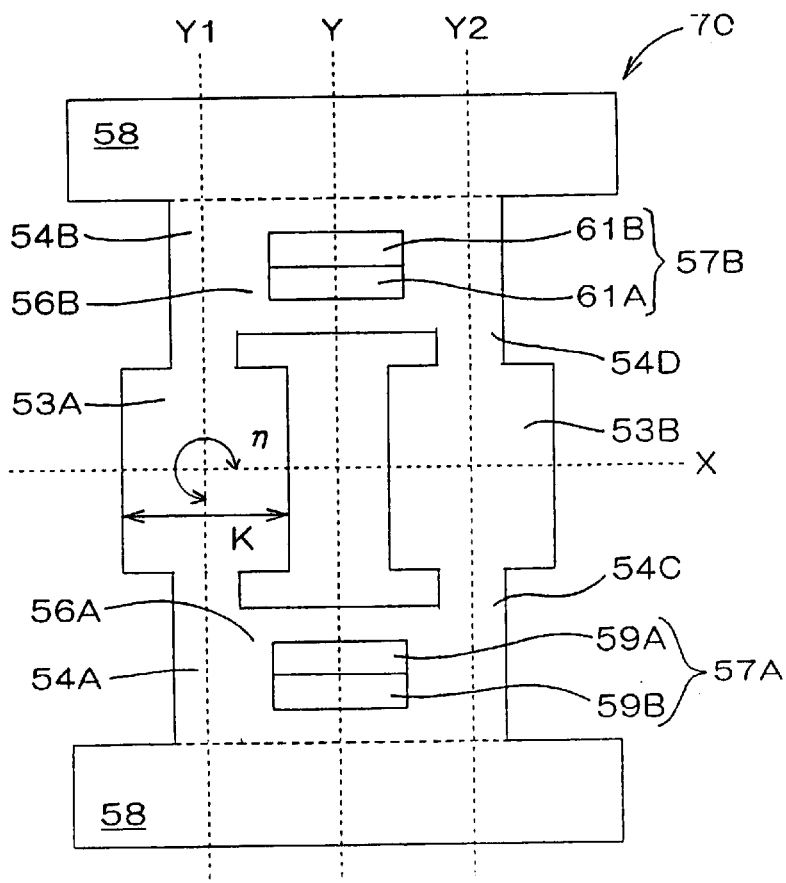
Figure 18A:
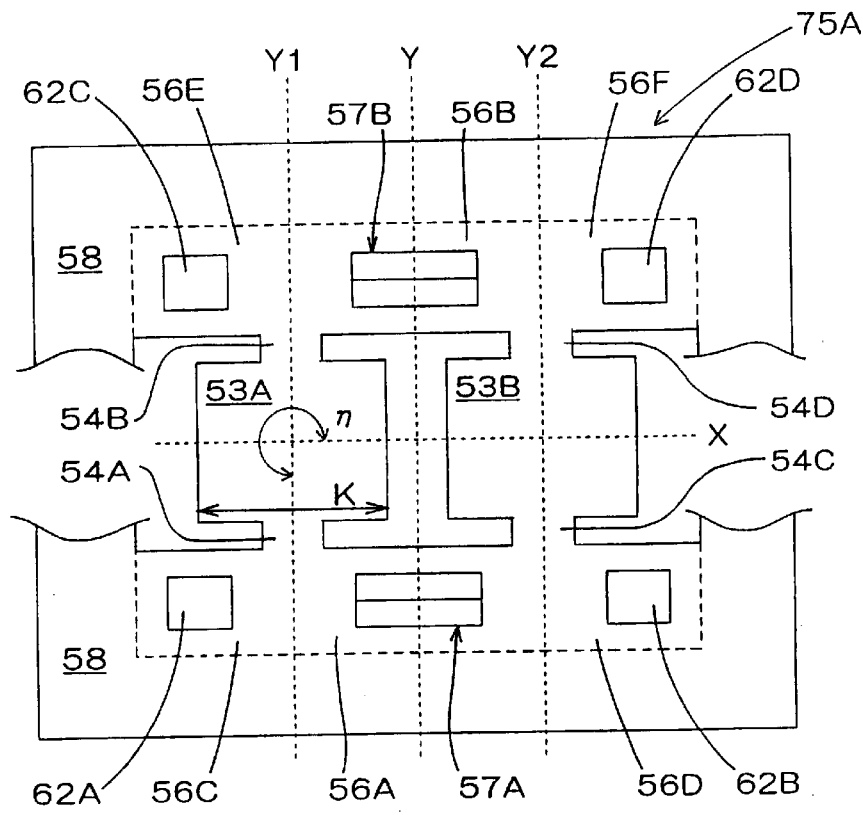
Figure 18B:
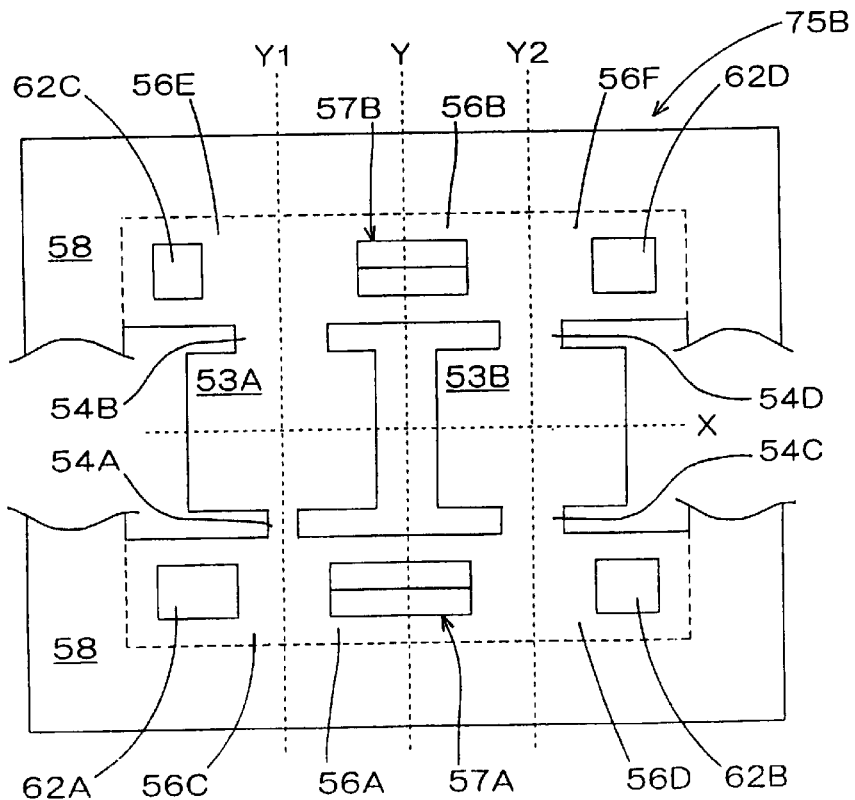
Figure 19:
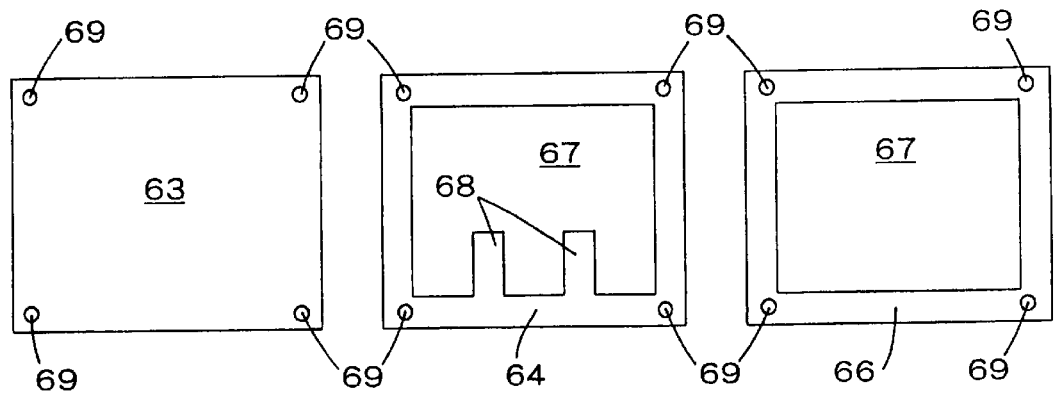
Figure 20:
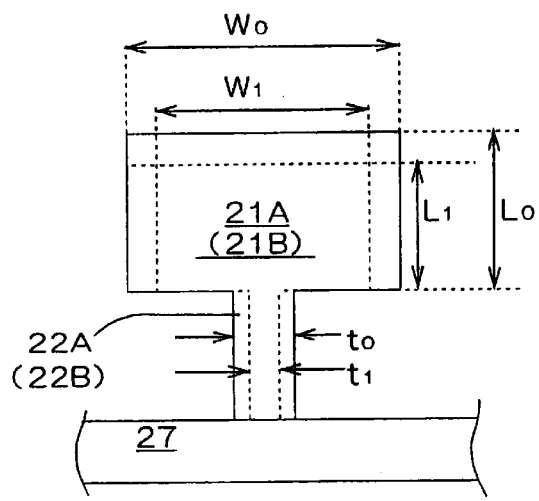
Figure 21:
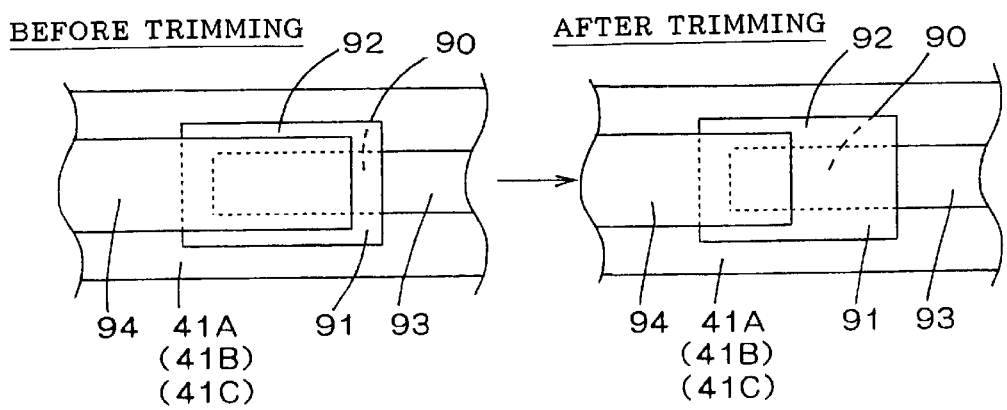

FIGS. (11A)–(11e) shows still another embodiment of a double-headed mass sensor of the present invention, (a) being a plan view, and (b) to (e) being sectional views;

FIGS. 12(a) and 12(b) are explanatory diagrams; related to the driving of a double-headed mass sensor of the present invention;

FIGS. 13(a) and 13(b) show still another embodiment of a double-headed mass sensor of the present invention, (a) being a plan view, and (b) being a sectional view;

FIG. 14 is a plan view showing still another embodiment of a double-headed mass sensor of the present invention;

FIGS. 15(a) through 15(d) show still another embodiment of a double-headed mass sensor of the present invention, (a) being a plan view, and (b) to (d) being sectional views;

FIG. 16 is a plan view showing still another embodiment of a double-headed mass sensor of the present invention;

FIG. 17 is a plan view showing still another embodiment of a double-headed mass sensor of the present invention;

FIGS. 18(a) and 18(b) are plan views showing still another embodiment of a double-headed mass sensor of the present invention;

FIG. 19 is a plan view showing an embodiment of the various shapes of green sheets used for fabricating a double-headed mass sensor of the present invention;

FIG. 20 is an explanatory diagram related to the establishment of a diaphragm in a double-headed mass sensor of the present invention;

FIG. 21 is an explanatory diagram showing an example of a method for processing a piezoelectric element of a double-headed mass sensor of the present invention;

FIG. 22 is a sectional view showing a basic structure of a conventional mass sensor;

FIG. 23 is a perspective view showing a structure of a quartz oscillator of a conventional quartz friction vacuum gauge;

FIG. 24 is a perspective view showing an embodiment of a conventional oscillation gyro sensor; and FIG. 25 is a perspective view showing another embodiment of a conventional oscillation gyro sensor.

BEST MODE FOR CARRYING OUT THE INVENTION

The double-headed mass sensor of the present invention will be described below referring to drawings, in particular focusing on a mass sensor used by applying a catching substance that reacts only with and catches a substance to be sensed to the diaphragm.

However, since the present invention is used in many other applications as described above, the present invention is not in any way limited to the embodiments described below.

Figure 1:
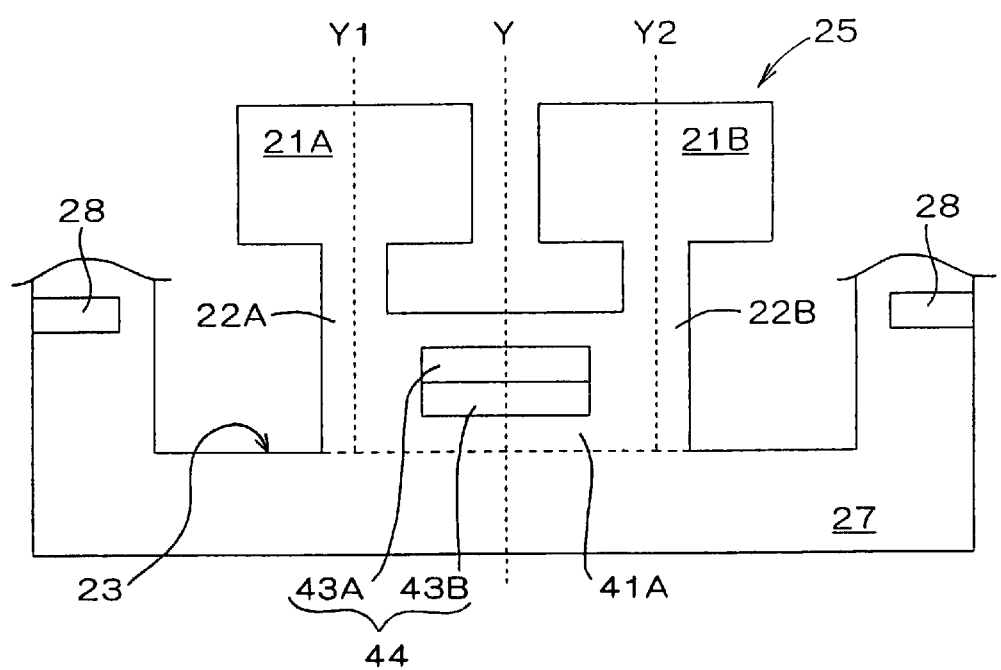
FIG. 1 is a plan view showing an embodiment of a double-headed mass sensor of the present invention.

FIG. 1 is a plan view showing an embodiment of the first double-headed mass sensor 25. The double-headed mass sensor 25 is characterized in that between a first connecting plate 22A joined to a first diaphragm 21A at respective sides and a second connecting plate 22B joined to a second diaphragm 21B at respective sides, a first sensing plate 41A, on which a main element 44 is provided on at least one plane surface, is bridged, and a resonating portion comprising each of said diaphragms 21A, 21B, each of the connecting plates 22A, 22B, the first sensing plate 41A, and the main element 44 is joined to a sensor substrate 27 at at least a part of sides of said first connecting plate 22A and said second connecting plate 22B.

Here, a diaphragm means the place to cause or to be subject to change in mass, and is an element that oscillates in various modes as described later; a connecting plate means an element to connect the diaphragm, sensor substrate, and sensing plate; and a sensing plate means an element that is deformed by the movement of the diaphragm, and transmits the strain to the sensing element, such as a piezoelectric element, installed on the surface, or on the contrary, transmits strain or oscillation generated by a driving element, such as a piezoelectric element, to the diaphragm. The sensor substrate means an element to support the resonating portion, carry various electrode terminals for connecting to measuring instruments, and is used for handling in actual uses. Although only one sensing plate is used in the double-headed mass sensor 25, it is referred to as the first sensing plate 41A in order to use the same expression as each sensing plate in other double-headed mass sensors described later.

In this double-headed mass sensor 25, the first sensing plate 41A is also joined to the sensor substrate 27. Also, there is provided a resonating portion having the shape in which the direction of the extension of the center line, that is the Y axis, dividing the plane surface of the first sensing plate 41A into two equal parts and perpendicular to the bridging direction of the first sensing plate 41A to each of the connecting plates 22A, 22B is parallel to the Y1 axis, that is the joining direction of the first connecting plate 22A and the first diaphragm 21A, and the Y2 axis, that is the joining direction of the second connecting plate 22B and the second diaphragm 21B, and symmetrical about the Y axis. Furthermore, the structure formed from dividing elements 43A, 43B which divide the main element 44 into the sensor substrate 27 side and diaphragms 21A and 21B side is preferably adopted.

A position sensor 28 consisting of a pair of electrodes is provided on the sensor substrate 27 at the middle location between each of diaphragms 21A, 21B and the main element 44. This position sensor 28 is suitably used in applications in which when the double-headed mass sensor 25 is immersed in an electrically conductive solution, the main element 44 is made not to be immersed in the solution even if the diaphragms 21A, 21B are immersed. Therefore, when the entire double-headed mass sensor 25 is immersed in an electrically conductive solution, or used in a gaseous atmosphere, the position sensor 28 is not necessarily required, and when the position sensor 28 is not provided, the sensor substrate 27 having the concave channel 23 as shown in FIG. 1 is not required.

Further, when the entire double-headed mass sensor 25 is immersed in an electrically conductive solution, electrode leads connected to the main element 44 and the electrode constituting the main element 44 must be coated with an insulation coating layer made of glass or a resin. This will be described later in detail referring to specific examples.

Figure 2A:
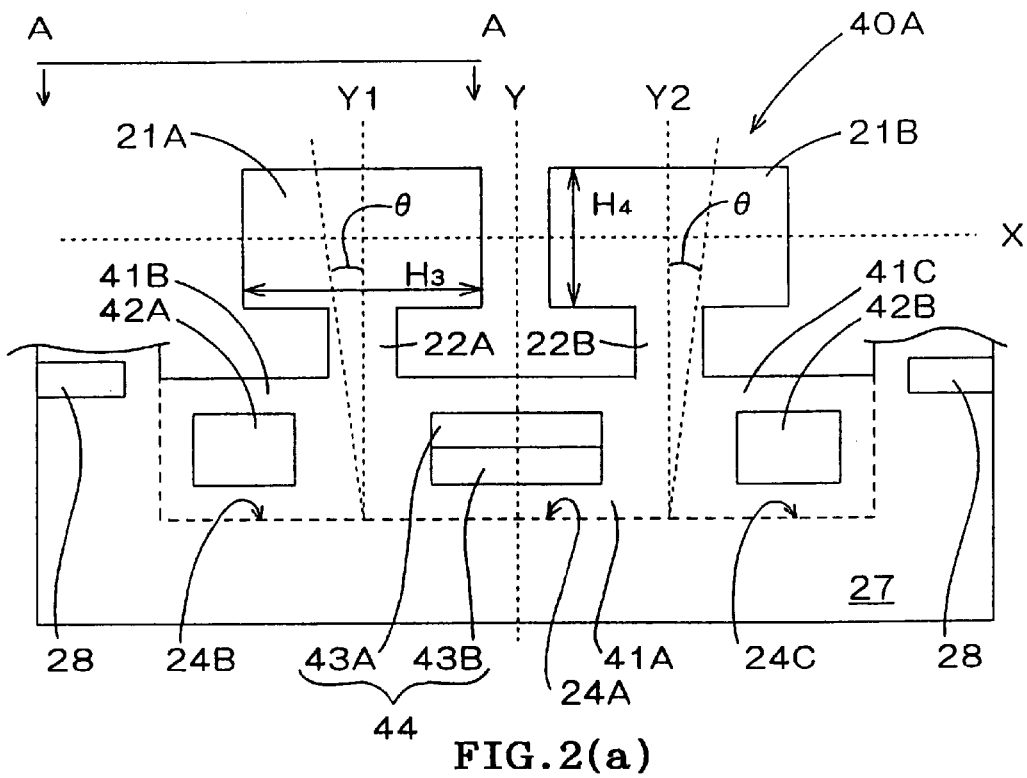
FIGS. 2(a) and 2(b) are plan views; and showing another embodiment of a double-headed mass sensor of the present invention.

Next, FIG. 2(a) is a plan view showing an embodiment of a second double-headed mass sensor 40A. A first connecting plate 22A is joined to a first diaphragm 21A, and a second connecting plate 22B is joined to a second diaphragm 21B at the respective sides, so that the first connecting plate 22A is located between a first sensing plate 41A and a second sensing plate 41B, and the second connecting plate 22B is located between the first sensing plate 41A and a third sensing plate 41C, so that the respective sides are joined to each other. A main element 44 is provided on at least one plane surface of the first sensing plate 41A, and a resonating portion comprising the diaphragms 21A, 21B, the connecting plates 22A, 22B, the sensing plates 41A, 41B, 41C, and the main element 44 is joined to the sensor substrate 27 at a part of the side of each of the connecting plates 22A, 22B to constitute the double-headed mass sensor 40A.

Each of sensing plates 41A, 41B, and 41C is joined to the sensor substrate 27 as in the double-headed mass sensor 25. Also, there is provided a resonating portion having the shape in which the extension of the direction of the center line, that is the Y axis, dividing the plane surface of the first sensing plate 41A into two equal parts and perpendicular to the bridging direction of the first sensing plate 41A to each of the connecting plates 22A, 22B is parallel to the Y1 axis, that is the joining direction of the first connecting plate 22A and the first diaphragm 21A, and the Y2 axis, that is the joining direction of the second connecting plate 22B and the second diaphragm 21B, and symmetrical about the Y axis. Further, a position sensor 28 is provided on the sensor substrate 27.

Here, also in the double-headed mass sensor 40A, as in the double-headed mass sensor 25, the main element 44 may be formed from divided elements 43A, 43B divided in the direction perpendicular to the X axis, which is the joining direction of sensing plates 41A through 41C and connecting plates 22A, 22B, that is the Y axis. Also, it is preferable to provide subsidiary elements 42A and 42B on at least one of plane surfaces of each of the second sensing plate 41B and the third sensing plate 41C. Thus, when the subsidiary elements 42A and 42B are provided, the subsidiary elements 42A and 42B may be formed from divided elements as in the main element 44.

However, even when the second sensing plate 41B and the third sensing plate 41C are provided, the subsidiary elements 42A and 42B are not always required. This is because the subsidiary elements 42A and 42B are used for the measurement of resonant frequencies in specific measurement conditions as described later, and because the second sensing plate 41B and the third sensing plate 41C have the effect to prevent the rotation of each of the connecting plates 22A, 22B about the Y1 axis and the Y2 axis.

On the other hand, it is also possible to use only the subsidiary elements 42A and 42B, without using the main element 44. For example, as also described in the method described later, when the main element 44 is used for measurement, twin peaks, in which a resonant peak is split, may occur. In this case, when the peaks are separated sufficiently, it is easy to read the resonant frequencies from each of the peaks, while when the peaks are close to each other, it is difficult to separate the peaks resulting in the problem of erroneous reading of the resonant frequencies.

Figure 2B:
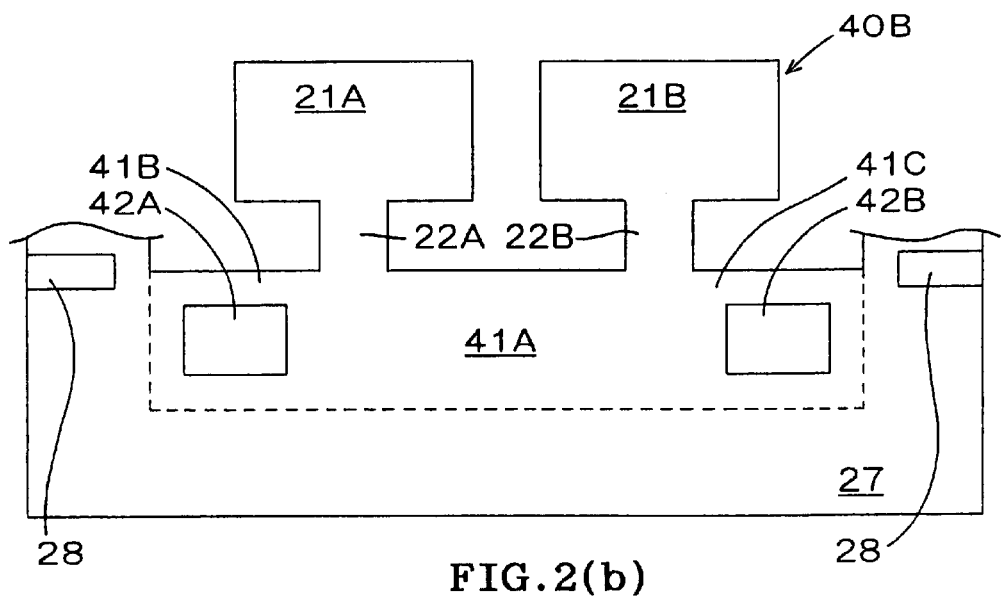

If such a case is estimated, measurement with the subsidiary elements 42A and 42B, without using the main element 44, has the advantage of easy determination because difference in intensities appears clearly even if the peak values approach each other. Also if only the subsidiary elements 42A and 42B are used, as in the double-headed mass sensor 40B shown in FIG. 2(b), it is preferable to provide the subsidiary elements 42A and 42B without using the main element 44, because the rigidity of the portion of the first sensing plate 41A lowers, facilitating the vibration of the diaphragms 21A, 21B, and increasing the peak intensity. In this case, one or more slits parallel to the Y-axis direction (see FIG. 2(a)) may be provided on the first sensing plate 41A. Further, when the subsidiary elements 42A and 42B are provided, it is needless to say that the subsidiary elements 42A and 42B are the constituting elements of the resonating portion.

In double-headed mass sensors 40A, 40B, it is very preferable for higher sensitivity that sensing plates 41A, 41B, and 41C are fitted in three concave portions 24A, 24B, and 24C formed by the connecting plates 22A, 22B and the sensor substrate 27, respectively. However, as in the double-headed mass sensor 45 shown in FIG. 3, it can be used corresponding to the required sensitivity even if the first sensing plate 41A is not joined to the sensor substrate 27, and a gap 46A is provided between the first sensing plate 41A and the sensor substrate 27. Such a gap 46A may be formed similarly for the double-headed mass sensor 25.

Also, although the second and third sensing plates 41B, 41C must be joined to the connecting plates 22A, 22B and sensor substrate 27 at the left and right sides for producing strain when receiving stress from diaphragms 21A, 21B or the like, gaps 46B may be provided without joining to the sensor substrate 27 at the lower side thereof. When such gaps 46A, 46B are provided, however, since a part of stress applied to the sensing plates 41A, 41B, and 41C is released by the deformation of the sensing plates 41A, 41B, and 41C, there is disadvantage of poorer detection sensitivity than the case where the gaps 46A, 46B are not provided.

Figure 3:
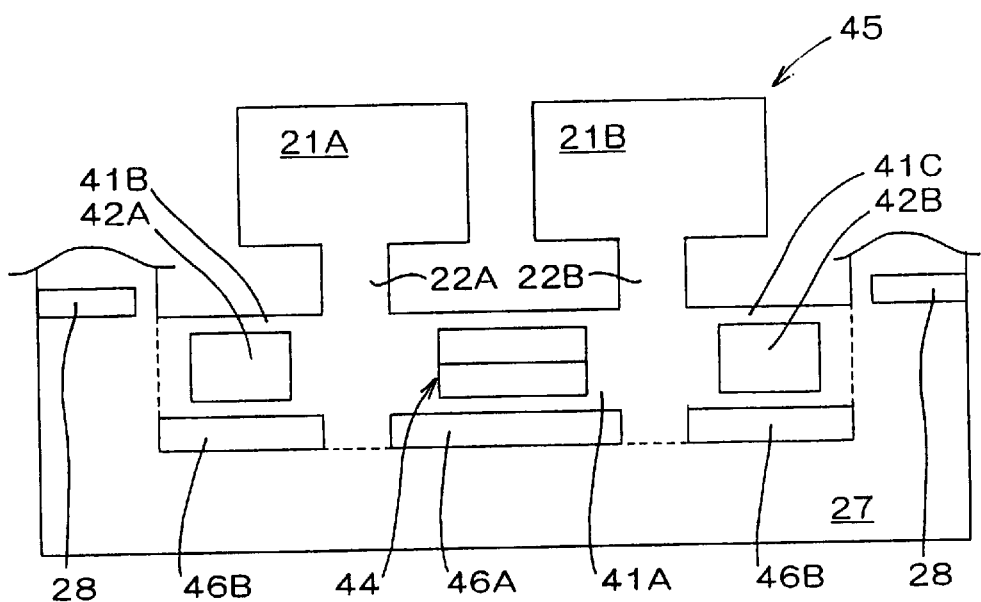
FIG. 3 is a plan view showing still another embodiment of a double-headed mass sensor of the present invention.

In the double-headed mass sensors 25, 40A, 40B, and 45, and the double-headed mass sensor 50 described later (hereinafter collectively referred to as "the double-headed mass sensor 25 and the like"), the shape of the plane surfaces of diaphragms 21A, 21B is not limited to rectangular as shown in FIGS. 1 to 3, but various optional shapes such as circular, triangular, polygonal, oval, and elliptic shapes may be used, and they are preferably symmetrical about the Y axis. In this case, each of the diaphragms 21A, 21B may be joined to the respective connecting plates 22A, 22B without being symmetrical about the Y1 axis and Y2 axis if there is symmetry about the Y axis. The freedom of the shape of diaphragms 21A, 21B is applied to all the double-headed mass sensors of the present invention.

Figure 4:
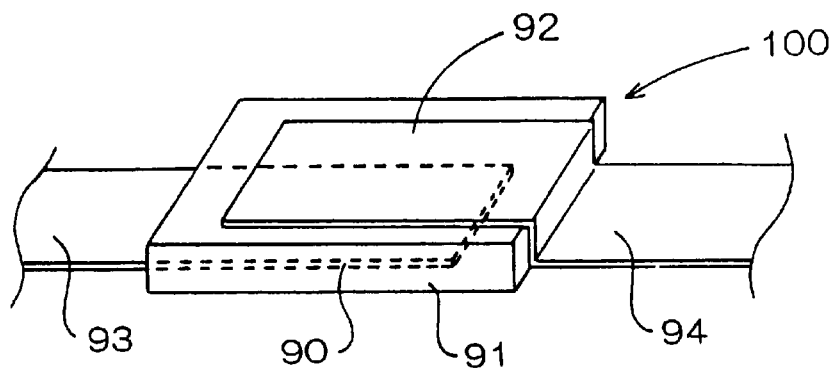
FIG. 4 is a perspective view showing an embodiment of a piezoelectric element formed in a double-headed mass sensor of the present invention.

As the main element 44 or subsidiary elements 42A, 42B provided on the double-headed mass sensor 25 and the like, a piezoelectric element constituted from a first electrode, a second electrode, and a piezoelectric film is suitably used. Such a piezoelectric element includes a piezoelectric element 100 having a laminated structure in which a first electrode 90, a piezoelectric film 91, and a second electrode 92 are formed as a laminar structure as shown in FIG. 4. Here, lead portions 93 and 94 are connected to the first electrode 90 and the second electrode 92, respectively, and by leading these lead portions 93 and 94 to the bottom of the sensor substrate 27 shown in FIGS. 1 to 3, a terminal portion, to which measurement terminals and the like are connected, is formed. In FIGS. 1 to 3, these lead portions 93 and 94 and the terminal portion are not shown.

Figure 5:
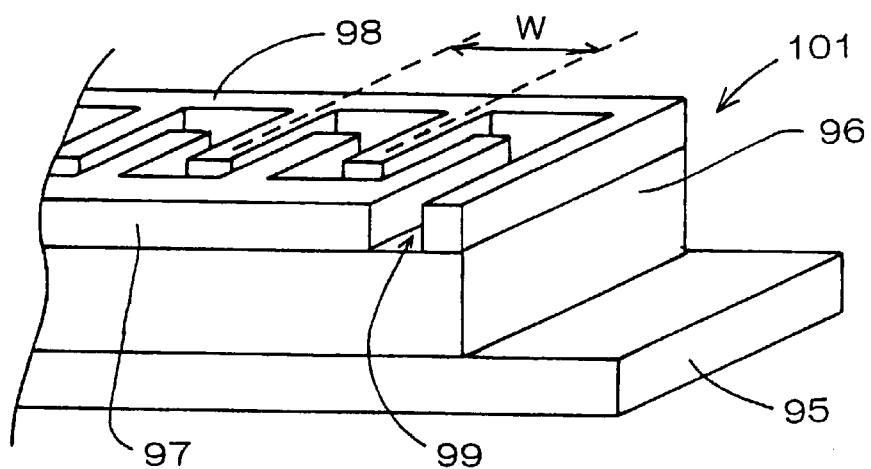
FIG. 5 is a perspective view showing another embodiment of a piezoelectric element formed in a double-headed mass sensor of the present invention.
Figure 6:
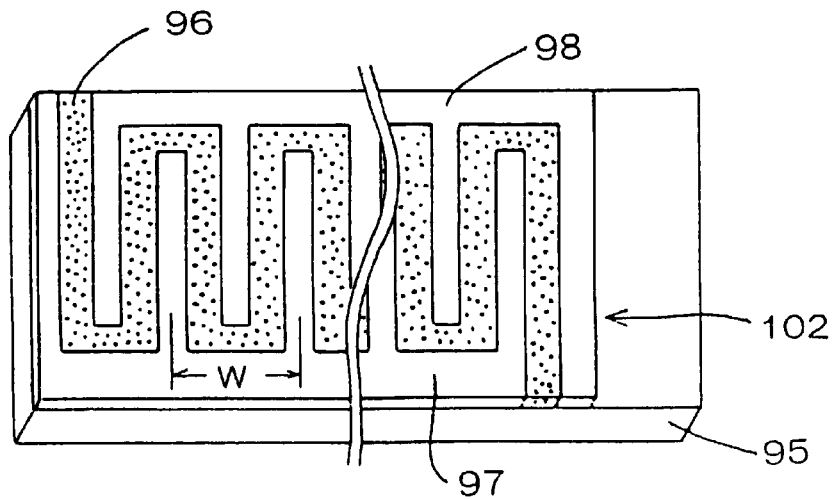
FIG. 6 is a perspective view showing still another embodiment of a piezoelectric element formed in a double-headed mass sensor of the present invention.

Also as FIG. 5 shows, a piezoelectric element 101 having a comb-shaped structure, in which a piezoelectric film 96 is provided on a sensing plate 95, and the first electrode 97 and the second electrode 98 form a regular gap 99 on the piezoelectric film 96, is suitably adopted. Here, the first electrode 97 and the second electrode 98 shown in FIG. 5 may be formed between the joining surface of the sensing plate 95 and the piezoelectric film 96. Furthermore, as FIG. 6 shows, there may also be used a piezoelectric element 102 formed by embedding the piezoelectric film 96 in the gap between comb-shaped first electrode 97 and second electrode 98 formed on the sensing plate 95. If such comb-shaped electrodes are used as shown in FIGS. 5 and 6, the measurement sensitivity can be elevated by decreasing the pitch W. These piezoelectric elements 100–102 are suitably used in all the double-headed mass sensors of the present invention.

Since the piezoelectric elements 100–102, which are the main element 44 or subsidiary elements 42A, 42B provided in the double-headed mass sensor 25 and the like, as well as each member constituting the resonating portion such as diaphragms 21A, 21B in the double-headed mass sensor 25 and the like, the method and materials suitably used for forming the sensor substrate 27, are the same as in the third and fourth double-headed mass sensors of the present invention described later, these will be collectively described later when the method for manufacturing double-headed mass sensors of the present invention is described.

Next, a typical oscillation mode of diaphragms 21A, 21B in the double-headed mass sensor 25 and the like, which is suitably adopted oscillation mode, will be described. The structure of the double-headed mass sensor 25 and the like is briefly expressed as a connecting plate is joined to each of two diaphragms at the respective sides, a sensing plate on which a main element or a subsidiary element is provided as required is bridged between the connecting plates, or provided so as to sandwich the connecting plates, and such connecting plates and such sensing plates are joined to a sensor substrate. Since the oscillation mode of each of the diaphragms 21A, 21B is the same as the oscillation mode of the first diaphragm 21A and the second diaphragm 21B, it will be described referring to FIG. 2 using the first diaphragm 21A as an example.

The first oscillation mode is the bending mode oscillation in which the first diaphragm 21A bends on the joining face of the first connecting plate 22A and the sensor substrate 27 as the fixed face, in the direction perpendicular to the Y1 axis, which is the vertical axis vertically passing through the center of this fixed face, and perpendicular to the plane surface of the first diaphragm 21 A (Z-axis direction, not shown in FIG. 2); the second oscillation mode is the oscillation of the axial rotation mode in which the first diaphragm 21A makes rotational oscillation around the Y1 axis as the central axis.

The third oscillation mode is the θ-mode swing oscillation in which the first diaphragm 21A makes pendulum-like oscillation making this Y1 axis as the central axis, in the direction perpendicular to the side of the first diaphragm 21A, and in the X-axis direction which is the direction perpendicular to the Y1 axis.

The fourth oscillation mode is the φ-mode swing oscillation in which the first diaphragm 21A makes pendulum-like oscillation making the Y1 axis as the central axis, in the direction perpendicular to the side of the first diaphragm 21A, and the swing toward the X axis which is perpendicular to the Y1 axis accompanies the swing in the direction parallel to the side of the first diaphragm 21A (Z axis, not shown in FIG. 2). It is preferable to measure the resonant frequencies of the resonating portion based on any of these four oscillation modes using the main element 44, and as required, together with subsidiary elements 42A, 42B.

These various oscillation modes mean that the direction of the oscillation of the diaphragm 21A is dominant in the directions described above, but do not mean that the directional components other than those in the described directions is completely eliminated. This is also applied to referring to oscillation modes in the description of various embodiments.

Figure 7A:
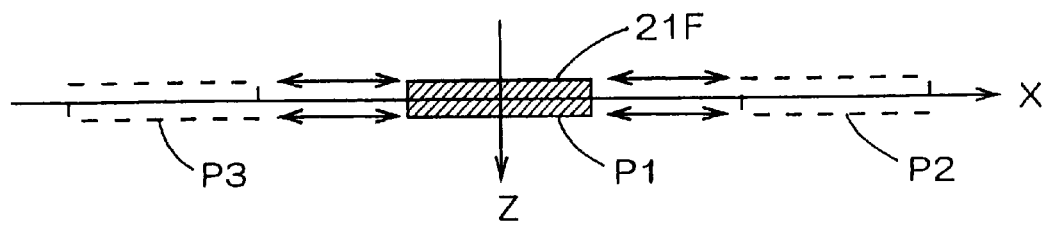
FIGS. 7(a) and 7(b) are explanatory diagrams of the oscillation modes of a double-headed mass sensor of the present invention, (a) being an explanatory diagram of θ-mode swing oscillation, and (b) being an explanatory diagram of φ-mode swing oscillation.

Here, the above θ-mode and φ-mode will be described in further detail. FIG. 7(a) is a plan view for illustrating the θ-mode, and is a plan view of the first diaphragm 21A taken in the direction of the arrows along the line A—A in FIG. 2, that is the X axis, from the Y-axis direction. The upper end surface 21F of the first diaphragm 21A is on the location P1 when not vibrating. Here, as described above, in the θ-mode, since the first diaphragm 21A makes pendulum-like oscillation in the plane parallel to the plane surface of the first diaphragm 21A, that is the X-Y plane so as to make a certain angle θ around the Y1 axis, in the view taken in the direction of the arrows along the line A—A, the movement of the upper end surface 21F can be expressed as a reciprocal movement between location P2 and location P3 on the X axis, and the mode of this reciprocal movement is defined as the θ-mode.

Figure 7B:
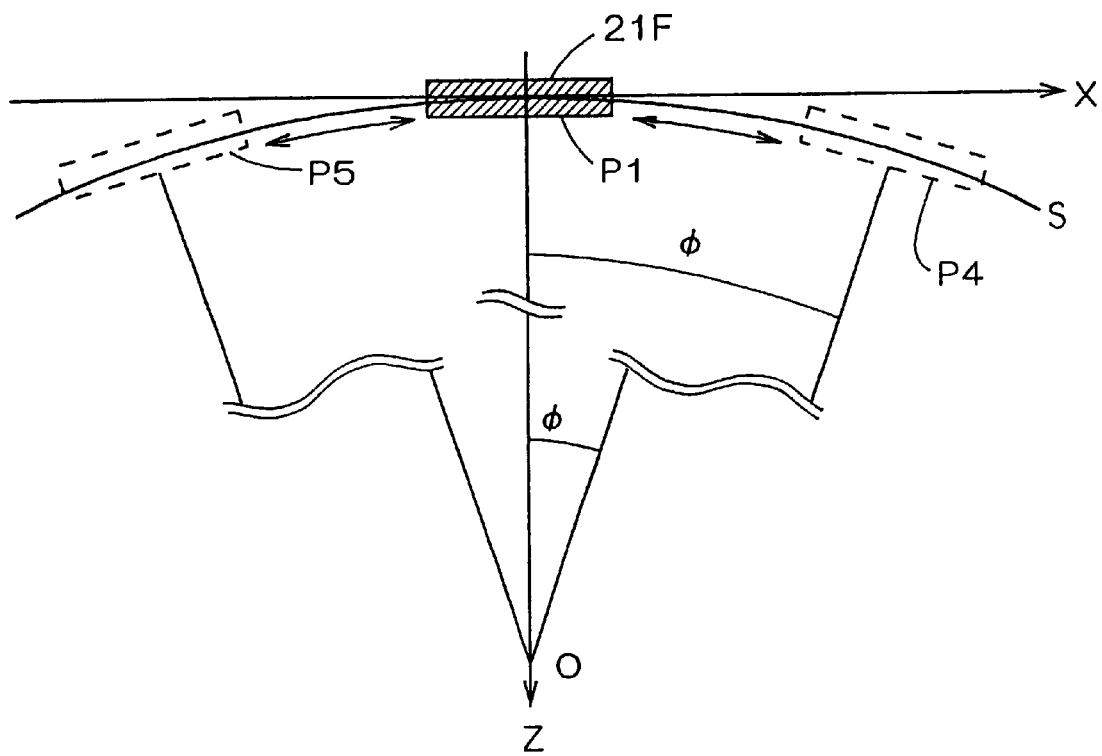

Next, FIG. 7(b) is a plan view illustrating the φ-mode, and as in FIG. 7(a), it is a plan view of the first diaphragm 21A taken in the direction of the arrows along the line A—A in FIG. 2. Here also, the upper end surface 21F of the first diaphragm 21A is on the location P1 when not vibrating. As described above, in the φ-mode, the first diaphragm 21A oscillates in the X-axis direction about the Y1 axis, and as apart from the Y1 axis, the first diaphragm 21A makes pendulum-like oscillation so that the swing component in the Z-axis direction parallel to the side of the first diaphragm 21A increases. This means that the movement of the upper end surface 21F viewed from the A—A direction can be expressed as a reciprocal oscillation between location P4 and location P5 on the arc orbit S passing through location P1 making a point on the Z axis the center O. The angle made by the straight line connecting the first diaphragm 21A to the center O and the Z axis is φ, and the above oscillation mode is defined as the φ-mode.

When various oscillation modes described above are used, the double-headed mass sensor 25 is advantageous for improving the dynamic range, because one main element 44 has two diaphragms 21A, 21B in view of the first sensing plate 41A, and the structure of each of the diaphragms 21A, 21B and each of the connecting plates 22A, 22B, and the first sensing plate 41A and the main element 44 has a tuning fork shape suitable for obtaining a high Q value.

When resonant frequencies are measured by immersing the diaphragms 21A, 21B in a liquid specimen using the bending mode and the axial rotation mode among various oscillation modes described above, there is a disadvantage in that each of the diaphragm 21A, 21B is subjected to resistance from the liquid corresponding to the area of each of the diaphragms 21A, 21B, and minute change in the mass of each of the diaphragms 21A, 21B cannot be sensed. However, when the specimen is gaseous, the bending mode can be used because the resistance is small, and at this time, it is preferable to shorten the length of each of the diaphragms 21A, 21B in the Y-axis direction and the X-axis direction.

Figure 8:
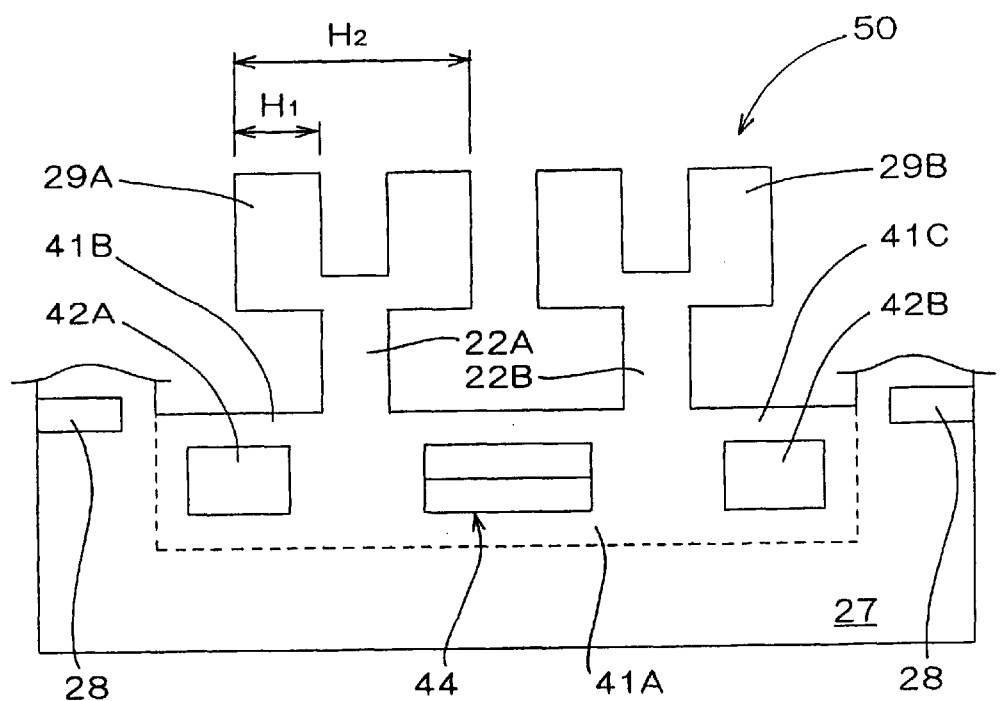
FIG. 8 is a plan view of still another embodiment of a double-headed mass sensor of the present invention in which the shape of the diaphragm is changed.

Also in the axial rotation mode making the Y axis as the central axis, change in the mass of each of the diaphragms 21A, 21B on the Y1 and Y2 axes little affects the rotational oscillation of each of the diaphragms 21A, 21B. That is, change in the mass of each of the diaphragms 21A, 21B in the vicinity of the Y1 and Y2 axes in each of the diaphragms 21A, 21B, which is the portion in which each of the connecting plates 22A, 22B is extended to each of the diaphragms 21A, 21B, contributes less to the rotational oscillation than change in the mass of each of the diaphragms 21A, 21B at left and right ends, and when these cases are compared, difference in measurement sensitivity is caused. Therefore, the measurement error can be reduced by decreasing the area in the vicinity of the Y1 and Y2 axes by making the shape of each of the diaphragms 21A, 21B concave to form diaphragms 29A, 29B as in the double-headed mass sensor 50 shown in FIG. 8. At this time, when change in the mass is the same, it is preferable to shorten the dimension $H_1$ for reducing the measurement error at the adhered or caught location, and to lengthen the dimension $H_2$ for elevating the dynamic range.

Whereas, when the θ-mode or φ-mode is used, since the effect of whether the specimen is liquid or gaseous can be ignored, and the effect of the location where the adhered substance adheres on each of the diaphragms 21A, 21B is small, and in a liquid or gas, the effect of the density or viscosity is small because each of the diaphragms 21A, 21B is thin, and moreover, the double-headed mass sensor resists change in temperature because each of the diaphragms 21A, 21B are operated in the rigid-body mode, the double-headed mass sensor excels in detection sensitivity and environment resistance. Also by shortening the dimensions $H_3$ and $H_4$ shown in FIG. 2, the effect of the adhered location can further be minimized. Therefore, it is preferable to use the θ-mode or φ-mode in the double-headed mass sensor 25 and the like of the present invention.

Further in the double-headed mass sensor 25 and the like, if the main element 44 is split into upper and lower portions as shown in FIGS. 1 to 3 to form two independent divided elements 43A and 43B, one for driving (exciting) and the other for sensing (receiving), detection accuracy (S/N ratio) can be improved compared with the use of the main element 44 without splitting. In this case, it is preferable to use the divided element 43A in the diaphragms 21A, 21B side for driving, and the divided element 43B in the sensor substrate 27 side for sensing, because the amplitude of vibration of each of the diaphragms 21A, 21B can be increased, and stress applied to the divided element 43B can be increased.

For splitting the main element 44, either a method for forming divided elements 43A, 43B separately from the beginning in the formation of the main element 44, or a method for forming divided elements 43A, 43B by splitting the main element 44 with laser processing or machining may be used.

However, in the piezoelectric element having comb-shaped electrodes as shown in FIG. 5 or 6, since each of the divided element 43A, 43B does not function due to splitting, or new lead portions must be provided on each of the divided element 43A, 43B, if the latter processing method is employed, it is preferable in view of the manufacturing process for avoiding such operations, to adopt the laminated piezoelectric element as shown in FIG. 4. When such a laminated piezoelectric element is used, the upper second electrode 92, the lead portion 94 connected thereto, and the piezoelectric film 91 can be split, without splitting the lower first electrode 90, and the lead portion 93 connected thereto for using in common. Of course, the first electrode 90 and the lead portion 93 connected thereto may be split as the piezoelectric film 91.

Thus, resonant frequencies can be measured using only the main element 44, and subsidiary elements 42A, 42B are not necessarily required; however, it is especially preferable to provide the subsidiary elements 42A, 42B for improving the Q value in the θ-mode. At this time, it is preferable for increasing the charge output of the piezoelectric element, to equalize the direction of polarization of piezoelectric films in the subsidiary elements 42A, 42B, and make it opposite to the direction of polarization of the piezoelectric film in the main element 44.

Here, it is preferable also to split the subsidiary elements 42A, 42B as in the case where the main element 44 is split, and to perform driving and sensing using separate elements, because the effect of improving the S/N ratio obtained by the main element 44 can also be obtained from the subsidiary elements 42A, 42B.

Next, the method for using the double-headed mass sensor 25 and the like will be described referring to the double-headed mass sensor 40A used as an immunosensor for sensing antigens or the like as an example. First, an antibody that reacts with the antigen to be sensed and catches this antigen is applied to the resonating portion. At this time, the antibody is applied mainly to each of the diaphragms 21A, 21B. The antibody may also be applied to each of the connecting plates 22A, 22B. However, when the specimen containing the antigen is a liquid or the like having electrical conductivity, it is preferable not to apply the antibody to sensing plates 41A, 41B, 41C, the main element 44, or the subsidiary elements 42A, 42B, but to coat the surface thereof with an insulation coating of a resin such as Teflon which is chemically stable and on which substances are difficult to be adhered. When such an insulation coating is applied to the main element 44 and the subsidiary elements 42A, 42B, it is preferable to apply the insulation coating also to the lead portions connected to the main element 44 and the subsidiary elements 42A, 42B.

Antigen/antibody combinations include, for example, human serum albumin/antihuman serum albumin antibody and human immune globulin/antihuman immune globulin antibody.

The resonant frequencies of the resonating portion are measured using the main element 44 and, as required, subsidiary elements 42A, 42B under the condition in which the diaphragms 21A, 21B are immersed in a liquid specimen, or exposed to a specific gas atmosphere. The resonant frequencies may be measured by drying the portion to which an antibody is applied, or the entire double-headed mass sensor 40A in a gas after the diaphragms 21A, 21B are immersed in the liquid.

Here, the resonant frequencies of the double-headed mass sensor 40A vary depending on the mass of each of the diaphragms 21A, 21B. That is, as FIG. 9 shows, the resonant frequencies $F_0$ of the resonating portion in the initial state in which no antigens have been caught on each of the diaphragms 21A, 21B, and the resonant frequencies $F_1$ of the resonating portion after the antigen has been caught, show different values depending on the mass of the caught antigen. Therefore, change in resonant frequencies from $F_0$ to $F_1$ is measured by the main element 44, and further, the mass of antigens caught by each of the diaphragms 21A, 21B can be measured by the combined use of subsidiary elements 42A, 42B corresponding to the condition.

Against such a using method, when antibodies are applied to one of the diaphragms 21A, 21B, for example to the first diaphragm 21A, and no antibody is applied, or a non-reactive chemical substance and the like is applied to the other second diaphragm 21B, as FIG. 10(a) shows, the resonant frequency based on each of the diaphragms 21A, 21B is the same $F_0$ under the initial condition, while by immersing the diaphragms 21A, 21B in the specimen, the antigens in the specimen are caught by the antibodies applied to the first diaphragm 21A, and the mass of only the first diaphragm 21A changes and only the resonant frequency caused by the first diaphragm 21A shifts causing $F_1$ to appear, and a twin-peak type curve having peaks at frequencies $F_0$ and $F_1$ is shown. By obtaining the difference in resonant frequencies, ΔF, showing the two peaks at this time, change in the mass of the first diaphragm 21A can be measured easily.

Whereas, if a certain antibody is applied to one of the diaphragms 21A, 21B, for example to the first diaphragm 21A, and an antibody different from the antibody applied to the first diaphragm 21A is applied to the other second diaphragm 21B, as FIG. 10(b) shows, the resonant frequency based on each of the diaphragms 21A, 21B is the same $F_0$ under the initial condition, while by immersing the diaphragms 21A, 21B in the specimen, a certain antigen in the specimen is caught by the antibody applied to the first diaphragm 21A, and the other antigen contained in the specimen is caught by the antibody applied to the second diaphragm 21B, causing respective resonant frequencies to shift, and the peak at the frequency $F_0$ disappears, but a twin-peak type curve having peaks at frequencies $F_1$ and $F_2$ is shown. By obtaining differences in resonant frequencies between initial resonant frequency $F_0$ and the resonant frequencies showing the two peaks, $\Delta F_1$ and $\Delta F_2$, change in the mass in each of the diaphragms 21A, 21B can be measured.

Thus, considering the method using either one of the diaphragms 21A, 21B as a reference sensor, or the method using each of the diaphragms 21A, 21B for measuring different changes in masses, it is also feasible to measure change in the mass, which is the major purpose of the mass sensor, using either one of the diaphragms, and to measure the physical properties, such as the flow rate and temperature of the liquid specimen, using the other diaphragm while eliminating the effect of the test environment.

Change in resonant frequencies described above is not limited to the time when the mass of the diaphragm changes, but also occurs when the mass of the connecting plate or sensing plate constituting the resonating portion, or the mass of the main element or subsidiary elements changes. Therefore, depending on the purpose or the object of measurement, there may be the case where the measurement of change in the mass of the location other than the diaphragm is preferred, or the using method in which antibodies or the like are applied to the entire resonating portion so as to increase the area to which antibodies or the like are applied, and change in the mass or the like is not necessarily required to occur only in the diaphragm.

According to the similar principle, the double-headed mass sensor 25 or the like can also be used for measuring the reduced quantity when the mass of each of the diaphragms 21A, 21B or the resonating portion decreases from the initial state. The double-headed mass sensor 25 and the like can be used suitably, for example, when applied antibodies have been peeled off for some reason, or when the corrosion or dissolution of an extremely small quantity of the material in a particular solution applied to the diaphragms 21A, 21B is to be checked, or for the purpose in which a particular chemical substance is applied to the diaphragms 21A, 21B in place of antibodies, and change in the quantity (evaporation, dissolution, etc.) of the chemical substance is to be measured.

In the measurement of change in resonant frequencies accompanying change in the mass of each of the diaphragms 21A, 21B or the resonating portion, resonant frequencies of the θ-mode or φ-mode are preferably used, as described above. For example, when an AC voltage is impressed to the piezoelectric film through the first electrode and the second electrode constituting the main element 44 (and subsidiary elements 42A, 42B), expanding and contracting vibration occurs in the piezoelectric film due to $d_{31}$ or $d_{33}$, causing bending motion to occur in the first sensing plate 42A (and the second sensing plate 42B and the third sensing plate 42C), and the vibrating angle θ of each of the diaphragms 21A, 21B changes corresponding to the mass of each of the diaphragms 21A, 21B, and a resonance phenomenon occurs at a certain frequency. Therefore, to check change in the resonant frequencies is to check whether or not the mass of each of the diaphragms 21A, 21B has changed, and whether or not the substances to be sensed such as antigens have been caught by the diaphragms 21A, 21B can be determined.

On the other hand, when each of the diaphragms 21A, 21B is oscillated by the external exciting force or the like, the movement is transmitted to each of the sensing plates 41A, 41B, 41C, and bending/flexural vibration occurs in the sensing plates 41A, 41B, 41C. At this time, if a laminated piezoelectric element 100 shown in FIG. 4 is used as the main element 44 provided on the plane surface of the first sensing plate 41A (and the subsidiary element 42B on the second sensing plate 41B, and the subsidiary element 42B on the third sensing plate 41C), expanding and contracting vibration occurs in the piezoelectric film 91 and a constant voltage or electric charge is generated on the basis of the electromechanical coupling factor $k_{31}$ (piezoelectric constant $d_{31}$)of the piezoelectric film 91. When the main element 44 (and subsidiary elements 42A, 42B) are piezoelectric elements having a comb-shaped electrode structure, for example, piezoelectric elements 101, 102 shown in FIGS. 5 and 6, a constant voltage or electric charge is generated on the basis of $k_{33}$ ($d_{33}$). By sensing the P-P value of such a voltage, and detecting the frequency when the P-P value becomes the maximum, the resonant frequency in the θ-mode or the like can be sensed, and change in the mass can be known.

By providing two main elements 44 (and subsidiary elements 42A, 42B) on both plane surfaces of the first sensing plate 41A (and the second sensing plate 41B and the third sensing plate 41C), and comparing the signals obtained, noise can be reduced, the effect of other oscillation modes can be eliminated, and detection sensitivity can be improved.

Another means for improving detection sensitivity includes the method in which the thickness of the diaphragms 21A, 21B is reduced to increase the mass ratio with the substance to be sensed such as antigens (the mass of the substance to be sensed/the mass of each of the diaphragms 21A, 21B), that is to increase the rate of change in the mass of each of the diaphragms 21A, 21B. Furthermore, when the thickness of the diaphragms 21A, 21B is reduced, if the mass is not changed but the surface area is increased, the area to which the catching substance such as antibodies is applied increases, and a larger quantity of the substance to be sensed can be caught, improving detection sensitivity.

Figure 11A:
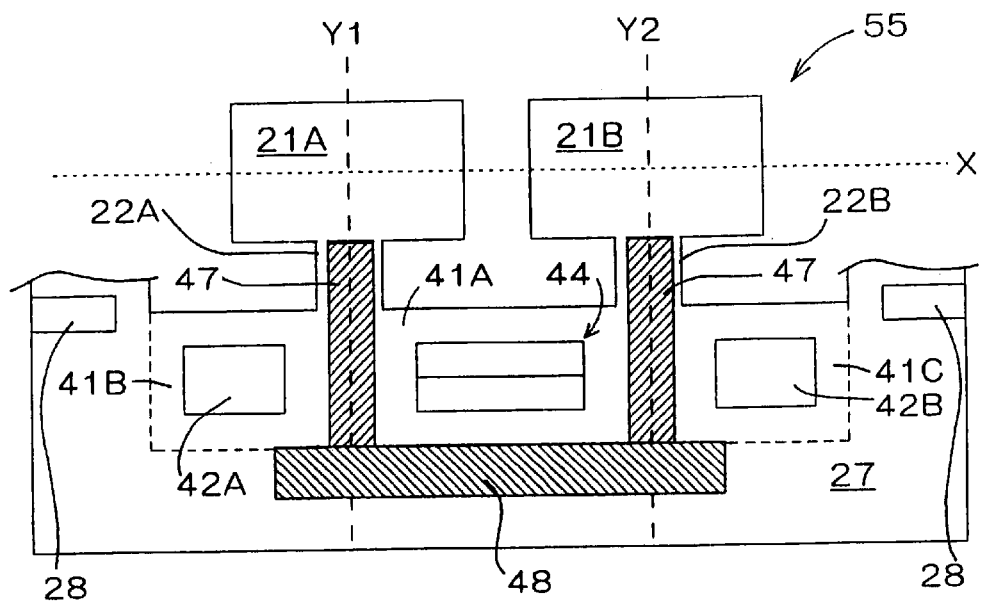

Next, a plan view of a double-headed mass sensor 55, which is an embodiment having a spring plate 47 and a spring plate reinforcing member 48 provided in a double-headed mass sensor 40A, is shown in FIG. 11(*a*); and various sectional views showing the providing examples of the spring plate 47 and the spring plate reinforcing member 48 viewed from the X-axis in the Y1 axis direction are shown in FIGS. 11(*b*) to (*e*). The cross-sectional forms shown in FIGS. 11(*b*) to (*d*) are the same for the Y2 axis, and the X axis is the direction orthogonal to the Y1 axis and the Y2 axis.

The spring plate 47 is joined to at least one of the plane surfaces of the connecting plates 22A, 22B of the same orientation, and although the width thereof may be narrower than the width of each of the connecting plates 22A, 22B as shown in FIG. 11(*a*), it is preferable to make the width the same as the width of each of the connecting plates 22A, 22B, and when the spring plates 47 are provided on both the plane surfaces of the connecting plates 22A, 22B, it is preferable to make the shape of the spring plates 47 the same as that of the connecting plates 22A, 22B in view of the sensor properties and the manufacturing process described later. Such spring plates 47 are normally joined to the sensor substrate 27, and at this time, the necessity of the spring plate reinforcing members 48 is determined by the location where each of the connecting plates 22A, 22B is joined to the sensor substrate 27.

For example, in the first connecting plate 22A, if the first connecting plate 22A is joined to the location where the spring plates 47A, 47B are directly joined to the sensor substrate 27 as FIGS. 11(*b*) and (*c*) show, there is no need to provide the spring plate reinforcing member 48 separately, because the sensor substrate 27 has also the function of the spring plate reinforcing member 48. At this time, only one of the spring plates 47A, 47B may be provided on one plane surface of the first connecting plate 22A.

However, if the first connecting plate 22A is directly joined to an end of the sensor substrate 27 as FIG. 11(*d*) shows, although the sensor substrate 27 has the function of the spring plate reinforcing member 48 for the spring plate 47A, it is preferable to provide the spring plate reinforcing member 48 for the spring plate 47B as the member to support the spring plate 47B. Even when the first connecting plate 22A is joined to an end of the sensor substrate 27 as FIG. 11(*e*) shows, if only the spring plate 47A which can be joined to the sensor substrate 27 is provided and the spring plate 47B is not provided, the spring plate reinforcing member 48 is not required. The second connecting plate 22B can be considered to be the same as the first connecting plate 21A.

By thus providing the spring plates 47, the mechanical strength of the resonating portion can be enhanced. Also, this is advantageous in that the thickness of each of the diaphragms 21A, 21B and each of the connecting plates 22A, 22B can be reduced, decreasing the attenuation of the resonant peaks in measurement in liquids. Furthermore, it is preferable to provide spring plates 47 on both the plane surfaces of each of the connecting plates 22A, 22B, since the center of gravity of the spring portion consisting of the connecting plates 22A, 22B and the spring plates 47 can be excited when each of the diaphragms 21A, 21B is excited by the main element 44, and each of the diaphragms 21A, 21B can easily swing in the θ-mode.

That is, in the plan view (a) of FIG. 11, the sectional views of the embodiments of the sectional views (d) and (e) in the vicinity of the connecting plate 22A viewed from the Y1 axis direction in the X-axis are shown in FIGS. 12(a) and (b). In FIG. 12(a), when the spring plates 47A, 47B are made from the same material and have the same shape, the main element 44 can excite the center 0 of the spring plate 47A, the spring plate 47B, and the first connecting plate 22A in the X-axis direction, the first diaphragm 21A and the entire resonating portion can easily swing in the X-axis direction, and therefore, can easily swing in the θ-mode.

From this, when the spring plates 47A, 47B are adhered on both the plane surfaces of each of the connecting plates 22A, 22B, if the center of gravity of the spring portion is on each of the connecting plates 22A, 22B, different materials and different shapes may be used in the spring plates 47A, 47B.

Whereas in FIG. 12(b), since the spring plate 47A and the center O of the first connecting plate 22A is not on the first connecting plate 22A, although the rotational mode is inhibited by the rigidity of the spring plate 47A itself, the driving force of the main element 44 in the X-axis direction (arrow $S_1$) is added as the rotational force (arrow $S_2$) for the center O, and the rotational mode occurs easily.

When the spring plate 47 is provided as described above, as further shown in the double-headed mass sensor 60 of FIG. 13, it is preferable to provide the reinforcing plate 49 joined to the spring plate 47 and joined to the side of the sensor substrate 27. FIG. 13(a) shows a front view of the double-headed mass sensor 60 viewed from the back, and FIG. 13(b) shows a sectional view of the double-headed mass sensor 60 along the X axis in FIG. 13(a) viewed in the Y-axis direction. Here, the reinforcing plate 49 is joined to the spring plates 47A, 47C joined to connecting plates 22A, 22B, respectively, and is joined to the sensor substrate 27. Furthermore, it is preferable that the reinforcing plate 49 is integrally formed with the spring plates 47A, 47C and the sensor substrate 27.

By making such a structure, since each of the diaphragms 21A, 21B resonates easily in the θ-mode and φ-mode, the attenuation of the Q value decreases and detection sensitivity is improved advantageously. Therefore, the mass sensor can be used suitably for measurement in a liquid.

Furthermore, in order to further improve the detection sensitivity of the double-headed mass sensors 55, 60, change in the resonant frequencies of the resonating portion must be increased, and one of the means for this purpose is the method for controlling the mass ratio of each of the diaphragms 21A, 21B and the spring plate 47. Detection sensitivity is improved as the thickness of the spring plate 47 is reduced to decrease the mass, and the mass ratio to each of the diaphragms 21A, 21B (the mass of each of the diaphragms 21A, 21B/the mass of the spring plate 47) is increased.

However, since the rigidity of the spring plate 47 lowers as the thickness of the spring plate 47 is reduced to decrease the mass, it is preferable that the mass ratio (the mass of each of the diaphragms 21A, 21B/(the mass of the spring plate 47 + the mass of each of the connecting plates 22A, 22B)) is made 0.1 or higher so that the rigidities of the spring plate 47 and each of the connecting plates 22A, 22B are secured considering the thickness and the area of each of the diaphragms 21A, 21B, and it is also preferable that the ratio is optimized considering the area of each of the diaphragms 21A, 21B.

As described in the method for manufacturing the double-headed mass sensor of the present invention described later, it is preferable that the spring plate described above is integrally formed with an intermediate plate integrally inserted between a vibrating plate and a base plate, or integrally formed with a spring plate reinforcing member integrally formed with the vibrating plate, and also integrally formed with each of connecting plates.

It is needless to say that such a spring plate can be applied to all the double-headed mass sensors according to the present invention in which connecting plates are used as the constituting members. Also, although the using method for double-headed mass sensors 55, 60 described above is the same as that of the double-headed mass sensor 25 and the like, when a catching substance such as an antibody is applied to each of the diaphragms 21A, 21B and the like, the antibody or the like may be applied also to the spring plate 47 or the reinforcing plate 49.

Next, the double-headed mass sensor 40C shown in FIG. 14 is an embodiment in which a slit 76 is provided at the central portion in the length direction of each of the connecting plates 22A, 22B in the double-headed mass sensor 40A shown in FIG. 2(a). The slit 76 is hollow, and has functions to facilitate each of the diaphragms 21A, 21B to oscillate in the θ-mode and φ-mode, and to make the recognition of resonant frequencies easy. It has also the function to reduce the mass of each of the connecting plates 22A, 22B, and to improve detection sensitivity. Furthermore, when the spring plate is provided, the spring plate may be fabricated in the shape having such a hollow, and may be formed integrally with the connecting plate.

Figure 15A:
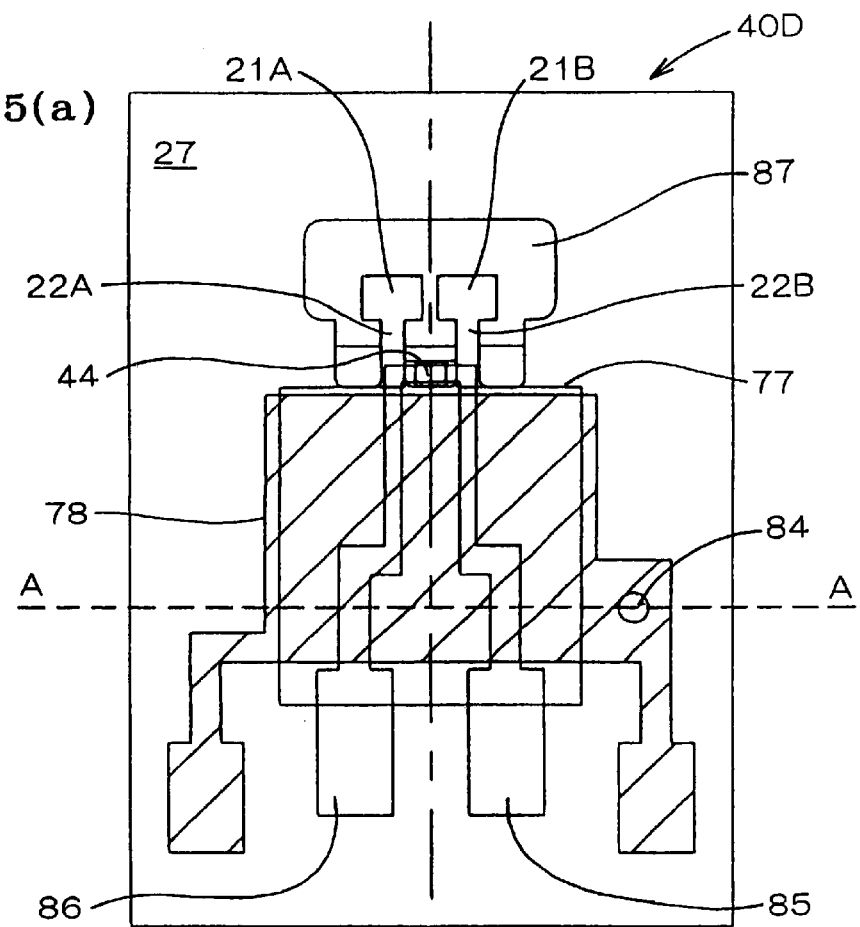
Figure 15B:
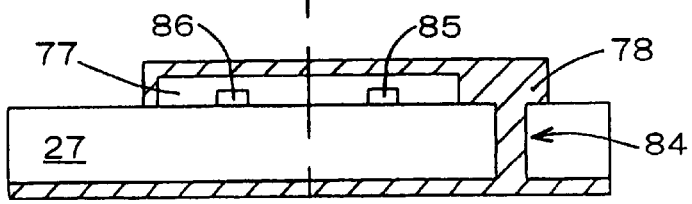

Next, FIG. 15(a) shows a plan view of a double-headed mass sensor 40D which is an embodiment in which the double-headed mass sensor 40A shown in FIG. 2(a) is formed in the opening 87 of the sensor substrate 27; FIG. 15(b) shows a sectional view along the broken line A—A in FIG. 15(a). In the double-headed mass sensor 40D, only a main element 44 is provided, and electrode leads 85, 86 are connected to the main element 44. An insulation coating layer 77 is formed so as to cover the main element 44 and the electrode leads 85, 86. By this insulation coating layer 77, the main element 44 and the electrode leads 85, 86 are prevented from short-circuiting even when the resonating portion of the double-headed mass sensor 40D is immersed in an electrically conductive specimen.

Also, the double-headed mass sensor 40D has a shield layer 78 made of a conductive member formed so as to cover the insulation coating layer 77. The shield layer 78 is formed on both surfaces of the sensor substrate 27 through a through-hole 84. When sensing a minute mass of a 0.1 ng order, it is preferable to shield not only the wiring from the sensor substrate 27 to the measuring instrument, but also wiring portions on the sensor substrate 27 (the main element 44 and the electrode leads 85, 86) for shielding external electromagnetic waves, and for minimizing the determination error of resonant frequencies.

Figure 15C:
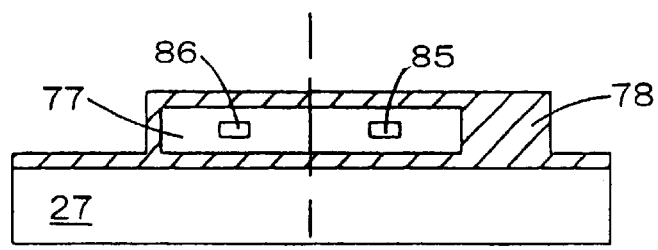
Figure 15D:
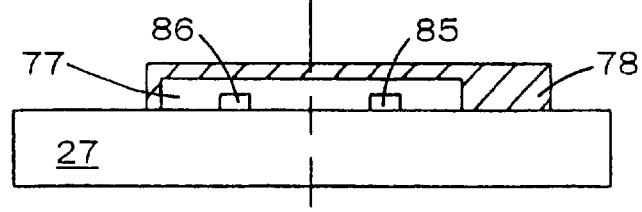

The forms of providing the shield layer 78 include a form in which the shield layer 78 is formed so as to sandwich the sensor substrate 27 as FIG. 15(b) shows, as well as a form in which the shield layer 78 surrounds only wiring portions on the sensor substrate 27 as shown in the sectional view of FIG. 15(c), and the shield layer 78 shields only the upper side of the wiring portions as FIG. 15(d) shows. Among these, the forms to shield the entire wiring portions as FIGS. 15(b) and (c) show are preferable. In FIG. 15(a), although the shield layers 78 formed on both surfaces of the sensor substrate 27 are connected to each other through the through-hole 84, they may be connected using the side of the sensor substrate 27. The details of materials preferably used for forming these insulation coating layer 77 and shield layers 78 will be described later together with the materials used in the double-headed mass sensors.

Next, as FIGS. 1 to 3, FIG. 11(a), or FIG. 14 show, the double-headed mass sensor according to the present invention is not necessarily required to have a shape symmetrical about the Y axis, but as the double-headed mass sensor 65 shown in the plan view of FIG. 16, the first connecting plate 52A and the second connecting plate 52B having shapes different from each other may be joined to the first diaphragm 51A and the second diaphragm 51B having shapes different from each other, respectively, so as to differentiate detection sensitivity from each other. It is needless to say that such differentiation of the shapes of the diaphragms 51A, 51B, and the connecting plates 52A, 52B can be applied also to the double-headed mass sensor 25 and the like, 55, and 60, as well as to double-headed mass sensor 70, 75A, and 75B, which will be described later.

By thus forming the structure such as the double-headed mass sensor 65, since difference occurs in the dynamic range on the basis of each of the diaphragms 51A, 51B, the total dynamic range for the entire double-headed mass sensor 65 can be increased. Therefore, it is not necessarily required to equalize the height $H_{y1}$ of the second sensing plate 41B with the height $H_{y2}$ of the third sensing plate 41C, and the width $W_{x1}$ of the second sensing plate 41B with the width $W_{x2}$ of the third sensing plate 41C. The using method or the like of the double-headed mass sensor 65 is the same as that of the double-headed mass sensor 25 and the like.

In International Patent Application JP97/01094 in accordance with the Patent Cooperation Treaty, various vibratory gyro sensor (hereinafter referred to as "gyro") as shown in FIGS. 24 and 25 having structures similar to the double-headed mass sensors of the present invention described above in appearance.

In the gyro shown in FIG. 24, two oscillators 2 are joined to a support table 4 at the respective basal end sides, and the site in the vicinity of the support table 4 is made thin to form a first plate-like portion 6 which functions as a sensing portion having a main surface (plane surface) extending in the direction of the arrangement of the oscillator 2. Also, the site of each of the oscillators 2 in the basal end side is made as a thin second plate-like portion 8 having a width narrower than the width of the oscillator 2, and having a main surface extending in the direction perpendicular to the first plate-like portion 6, and each of the oscillators 2 is joined to the support table 4 through this second plate-like portion 8. Furthermore, each of the oscillators 2 is joined to a third plate-like portion 10 thinner than the oscillators 2 having a main surface parallel to the main surface of the first plate-like portion 6 at the site between each of the first plate-like portion 6 and the second plate-like portion 8.

Each member of these oscillators 2 and so on is constructed by integrally sintered ceramics, and a piezoelectric/electrostrictive element 12 for sensing is formed on the first plate-like portion 6, and a piezoelectric/electrostrictive element 14 for driving is formed on the third plate-like portion 10. A cut portion 16 provided on each of the oscillators 2 is used for adjusting the resonant frequency of the oscillator 2 by trimming or the like, and by making the support table 4 thicker than the oscillator 2 using a spacer portion 18, the structure in which the oscillator 2 is not interfered by the installing surface even when the support table 4 is installed using bolts 20 on the flat installing surface such as a substrate.

In the gyro having such a structure, the third plate-like portion 10 driven by the piezoelectric/electrostrictive element 14 is deformed, and each of the oscillators 2 is vibrated in an approaching/receding direction along the X axis. In this state, when each of the oscillators 2 is subjected to a rotational force around the Z axis, a Coriolis force acts to each of the oscillators 2 in the Y-axis direction based on the angular velocity around the Z axis, and each of the oscillators 2 is vibrated in the Y-axis direction by the Coriolis force in the direction opposite to each other. This bending vibration of the oscillator 2 is sensed by the piezoelectric/electrostrictive element 12 for sensing as an electromotive force.

In the gyro, therefore, in order to raise detection accuracy and detection sensitivity, the shape of each member is designed so as to generate a large Coriolis force. For this purpose, the oscillator 2 of a larger mass is preferable, and therefore, the oscillator 2 is designed to be thick. Also, the mass of the oscillator 2 must not change during using. If the mass of the oscillator 2 changes, difference in the generated Coriolis force occurs even if the rotational force of the same magnitude acts on the oscillator 2, resulting in different detected values, and accurate measurement becomes impossible.

Furthermore, in order to detect the generated Coriolis force efficiently, the piezoelectric/electrostrictive element 12 for sensing must be formed on the first plate-like portion 6 constituting the oscillator 2. In addition, by forming the second plate-like portion 8 from a thin plate having the main surface in the Y-axis direction, its rigidity in the X-axis direction is lowered, and by decreasing the width/height ratio, vibration in the Y-axis direction, which is the cause to lower sensitivity. Moreover, a gap is provided between the third plate-like portion 10 and the support table 4 to make the structure facilitating the oscillator to vibrate in the X-axis direction.

Whereas, in the gyro shown in FIG. 25, the piezoelectric/electrostrictive element 12 for sensing is provided so as to cover almost the entire surface of the first plate-like portion 6 formed to be thin, and the first plate-like portion 6 constitutes the oscillator 2, but the constitution of other members is the same as the gyro shown in FIG. 24. In such an oscillator 2 comprising a wide and long first plate-like portion 6, since the mass and the moment increase, and, as a result, the amplitude driven by the piezoelectric/electrostrictive element 14 increases, sensitivity can be improved. Also, since the area of the piezoelectric/electrostrictive element 12 is large, a large quantity of electric charge can be accumulated, it is advantageous in applications using the current detection method.

In comparison with the gyro described above, from the object of the double-headed mass sensor of the present invention to sense a minute mass, since the mass of the diaphragm corresponding to the oscillator of the gyro is preferably as small as possible, it must be formed as a thin plate, and further, the installation of the piezoelectric element on the diaphragm, in particular, the installation of the piezoelectric element for sensing, is obviously not preferable from the measurement principle described above. Also, that the mass of the diaphragm must change during measuring, and the using method in which the mass sensor must be used in the environment where no Coriolis force acts, are completely different from the gyro.

Furthermore, as in the gyro described above, the gap may be provided between the sensing plate and the sensor substrate in a double-head mass sensor. In this case, however, since stress applied to the main element decreases and detection sensitivity lowers, it is normally preferable not to provide such a gap in the double-headed mass sensor. It is also not preferable that the connecting plate and the spring plate of the double-headed mass sensor corresponding to the second plate-like portion 8 of the gyro have the thin-plate structure required by the gyro, that is, the structure in which the length of the plate-like portion 8 in the X-axis direction is very shorter than the length in the Y-axis direction, because the attenuation of oscillation amplitude increases when used, for example, in a liquid.

In addition to the above, in the gyro, it is necessary to provide a piezoelectric element for sensing and a piezoelectric element for driving separately. Whereas in the double-headed mass sensor, the main element is used so that the main element itself plays both the rolls of sensing and driving, and splitting the main element into driving (exciting) and sensing (receiving) is only a means for improving the S/N ratio. Also in the double-headed mass sensor, the method for measuring resonant frequencies is different in that various modes such as the θ-mode, φ-mode, and axial rotation mode are used, other than the bending mode used in the gyro.

Thus, it will be obvious that although the gyro and the double-headed mass sensor have structures similar to each other at a glance, there are various basic differences for achieving their objects, and the method and mode of using are also completely different. Also, the structure in which a spring plate is provided on both the surfaces of the connecting plates 21A, 21B, as in the double-headed mass sensor 60, or the embodiment of the double-headed mass sensor dominantly oscillating in the 0-mode further using a reinforcing plate, as in the double-headed mass sensor 65, is not disclosed or suggested in JP 97/01094.

Now, a plan view showing an embodiment of a third double-headed mass sensor 70 of the present invention is shown in FIG. 17. Each plate is joined at respective sides so that a first diaphragm 53A is sandwiched between a first connecting plate 54A and a second connecting plate 54B, and a second diaphragm 53B is sandwiched between a third connecting plate 54C and a fourth connecting plate 54D. A first sensing plate 56A is bridged between the first connecting plate 54A and the third connecting plate 54C, and a second sensing plate 56B is bridged between the second connecting plate 54B and the fourth connecting plate 54D. A first main element 57A is provided on at least one of the plane surfaces of the first sensing plate 56A, and a second main element 57B is provided on at least one of the plane surfaces of the second sensing plate 56B. A resonating portion is formed of the diaphragms 53A, 53B, the connecting plates 54A–54D, the sensing plates 56A, 56B, and the main elements 57A, 57B. The resonating portion thus formed is bridged between the sides of a sensor substrate 58 having sides facing to each other across a gap or space to form a double-headed mass sensor 70.

In the double-headed mass sensor 70, the Y1 axis which is the direction in which the first connecting plate 54A and the second connecting plate 54B sandwich the first diaphragm 53A, the Y2 axis which is the direction in which the third connecting plate 54C and the fourth connecting plate 54D sandwich the second diaphragm 53B, and the extension of the Y axis which is the line dividing the plane surface of each of the first sensing plate 56A and the second sensing plate 56B into two equal parts, are parallel to each other, and there is formed the resonating portion having a symmetrical shape about both the X axis which is orthogonal to the Y axis, the dividing line, and passes through the center of each of the first diaphragm 53A and the second diaphragm 53B and the Y axis.

Also in the double-headed mass sensor 70, similar to the double-headed mass sensor 25 and the like, it is preferable to divide each of the main elements 57A, 57B into divided elements 59A, 59B and 61A, 61B, respectively, and to use those in the side of the diaphragms 53A, 53B for driving, and those in the side of the sensor substrate 58 for sensing, and each of main elements 57A, 57B may be provided on both plane surfaces of each of the sensing plates 56A, 56B. Also similar to the double-headed mass sensor 55 shown in FIG. 11, it is preferable to install spring plates, and as required, spring plate reinforcing members on each of the connecting plates 54A–54D to increase the rigidity of the connecting plates 54A–54D.

FIG. 18(*a*) is a plan view showing an embodiment of a fourth double-headed mass sensor 75A. Each plate is joined at respective sides so that a first diaphragm 53A is sandwiched between a first connecting plate 54A and a second connecting plate 54B, and a second diaphragm 53B is sandwiched between a third connecting plate 54C and a fourth connecting plate 54D. Furthermore, each plate is joined at respective sides so that a first connecting plate 54A is positioned between the first sensing plate 56A and the third sensing plate 56C, a third connecting plate 54C is positioned between the first sensing plate 56A and the fourth sensing plate 56D, a second connecting plate 54B is positioned between the second sensing plate 56B and the fifth sensing plate 56E, and a fourth connecting plate 54D is positioned between the second sensing plate 56B and the sixth sensing plate 56F. Furthermore, a first main element 57A is provided on at least one of the plane surfaces of the first sensing plate 56A, and a second main element 57B is provided on at least one of the plane surfaces of the second sensing plate 56B. A resonating portion is formed of the diaphragms 53A, 53B, the connecting plates 54A–54D, the sensing plates 56A–56F, and the main elements 57A, 57B. The resonating portion thus formed is bridged between the sides of a sensor substrate 58 having sides facing to each other across a gap or space to form a double-headed mass sensor 75A.

In the double-headed mass sensor 75A, the Y1 axis which is the direction in which the first connecting plate 54A and the second connecting plate 54B sandwich the first diaphragm 53A, the Y2 axis which is the direction in which the third connecting plate 54C and the fourth connecting plate 54D sandwich the second diaphragm 53B, and the extension of the Y axis which is the line dividing the plane surface of each of the first sensing plate 56A and the second sensing plate 56B into two equal parts, are parallel to each other, and there is formed the resonating portion having a symmetrical shape about both the X axis which is orthogonal to the Y axis, and passes through the center of each of the first diaphragm 53A and the second diaphragm 53B and the Y axis.

In the double-headed mass sensor 75A, similar to the double-headed mass sensor 70 described above, it is preferable to divide each of the main elements 57A, 57B into divided elements 59A, 59B and 61A, 61B, respectively. Also, similar to the double-headed mass sensor 40A, it is preferable to provide subsidiary elements 62A, 62B, 62C, and 62D similar to the subsidiary elements 42A, 42B, on the third sensing plate 56C, the fourth sensing plate 56D, the fifth sensing plate 56E, and the sixth sensing plate 56F, respectively.

The structures of the double-headed mass sensors 70 and 75A can be briefly expressed as a structure in which each of two diaphragms is joined so as to be sandwiched by connecting plates at the respective sides, a sensing plate on which an element is installed is bridged between the connecting plates, or provided so as to sandwich the connecting plates, and the connecting plates and sensing plates are bridged between the sides of the sensor substrate facing to each other across the gap.

The use of the double-headed mass sensors 70 and 75A having the above-described structure is the same as that of the double-headed mass sensor 25 and the like, and the oscillation modes of each of the diaphragms 53A, 53B are also the same. In this structure, however, in addition to the above, in the first diaphragm 53A, for example, as shown in FIGS. 17 and 18(a), the surface rotational oscillation of the η-mode, in which the first diaphragm 53A makes rotationally reciprocal oscillation around the center of the first diaphragm 53A on the plane surface of the first diaphragm 53A, and the reciprocal oscillation of the monoaxial-mode in which the reciprocal oscillation on the plane surface of the first diaphragm 53A in the X-axis direction orthogonal to the Y axis as indicated by the arrow K is dominant, are used. The surface rotational oscillation of the η-mode and the reciprocal oscillation of the monoaxial-mode are not general names, but these are defined in the present invention to distinguish various oscillation modes. This is also the same for the θ-mode and φ-mode described above.

In particular, the resonance of the monoaxial-mode in the X-axis direction is advantageous in that difference in sensitivity caused by the location where change in mass has occurred, for example, when antigens have adhered on the diaphragms 53A, 53B and the mass has increased, the location where the antigens have adhered, is especially small. When the η-mode is used, the direction of polarization of the main elements 57A, 57B is made opposite to each other.

Also, in the double-headed mass sensors 70 and 75A, since the diaphragms 53A, 53B are supported by connecting plates 54A–54D, and as required, by joining spring plates, resonant frequencies can be increased, and sensitivity can be improved. Though, to enlarge an area of a diaphragm is not preferable in general because resonant frequencies is lowered, resonant frequencies can be specified to be high in the structures shown in FIGS. 17 and 18 even if a diaphragm having the same size is used because the diaphragm is sandwitched and therefore has high rigidity, and the shift of resonant frequencies increases due to change per unit mass, resulting in the ease of determination. Furthermore, when subsidiary elements 62A–62D are provided in the double-headed mass sensor 75A, the use of the η-mode described above for the measurement of resonant frequencies can increase the Q value. Of course, it is also preferable to provide each of the subsidiary elements 62A–62D as divided elements as in each of the main elements 57A, 57B. In the double-headed mass sensor 75A, although the shape of the connecting plates 54A–54D is the same, the double-headed mass sensor 75B having a higher measurement sensitivity in the θ-mode can be produced by differentiating the width of the connecting plates sandwiching a diaphragm, for example, by narrowing the width of the first connecting plate 54A and widening the width of the second connecting plate 54B as FIG. 18(b) shows.

Next, members constituting all the double-headed mass sensors of the present invention described above will be described. Members such as the diaphragm, the connecting plate, the sensing plate, the spring plate, the spring plate reinforcing member, the reinforcing plate, and the sensor substrate are preferably made of ceramics, specifically, stabilized or partially stabilized zirconia, alumina, magnesia, or silicon nitride. Among these, stabilized or partially stabilized zirconia is most preferably used because they have a high mechanical strength, a high toughness, and a low reactivity with the materials of piezoelectric films or electrodes, even as a thin plate. When stabilized or partially stabilized zirconia is used as the material for the sensor substrate, it is preferable to add an additive such as alumina and titania at least to the sensing plate.

Although each of the diaphragm, the connecting plate, the sensing plate, and the spring plate, the spring plate reinforcing member, and the reinforcing plate provided as required are not necessarily required to be composed of the same material, and various ceramic materials may be used in combination depending on the design. However, it is preferable to constitute these members integrally using the same material from the point of view of the reliability of the parts where these members are joined, and the simplification of the manufacturing process. Therefore, it is preferable that these members are integrally formed with the sensor substrate.

In order to obtain a double-headed mass sensor having such an integral structure, it is preferable that the diaphragm, the connecting plate, and the sensing plate are integrally formed from a vibrating plate by punching or the like, and the sensor substrate is integrally formed by laminating the vibrating plate and a base plate, as shown in the method for manufacturing a double-headed mass sensor described later.

Also, when the spring plates joined to the connecting plates are formed, it is preferable to form the spring plates from the original intermediate plate in the sensor substrate integrally formed by inserting the intermediate plate between the vibrating plate and the base plate. Thus, the sensor substrate and the spring plate can be integrally formed, and the spring plate and the connecting plate can also be integrally formed. Furthermore, the spring plate reinforcing member can also be integrally formed with the vibrating plate, and the reinforcing plate can be formed integrally with a sensor substrate by connecting as a reinforcing plate at least one to several of the thin plates forming the base plate with the spring plate. That is, the members can be integrally joined without using adhesives, to make joining having a high mechanical reliability and excellent temperature properties.

Major purpose of the double-headed mass sensor is sensing minute change in a mass. For this purpose, however, the thickness of the diaphragm is preferably about 3 to 20 $\mu$m, and for sensing change in the mass of a 0.1 nanogram (ng) order, the thickness is preferably about 5 to 15 $\mu$m. Since the connecting plate itself functions as the spring plate, the spring plate is not necessarily required, but when the spring plate is provided, the thickness of the connecting plate is preferably 3 to 100 μm, and the thickness of the base plate is suitably determined considering the ease of operation. When no spring plate is provided, the intermediate plate is not required, but in this case, it is preferable to thicken the base plate by the thickness of the intermediate plate so as to maintain the mechanical strength of the sensor substrate.

However, when the spring plates are formed on both the plane surfaces of the connecting plate, the spring plate formed on the surface on which a piezoelectric element is formed may be what has the same structure as the piezoelectric element formed as the spring plate. This is preferred from the point of view of the manufacturing process because the spring plate can be simultaneously formed with the piezoelectric element. However, for the piezoelectric element formed as the spring plate, the electrodes constituting the piezoelectric element are not used as electrodes.

When a spring plate is formed, in either case where it is bonded on one side or on both sides of the connecting plate, the thickness is preferably 10 to 220 μm, the width is preferably 100 to 500 μm, and the aspect ratio (width/thickness) of the spring plate is preferably in a range between 0.4 and 50. Furthermore, when the attenuation of oscillation amplitude by the use of the double-headed mass sensor in a liquid is considered, the thickness is preferably 10 to 70 μm, the width is preferably 100 to 500 μm, and the aspect ratio is preferably 1.4 to 50. More preferably, a thickness of 10 to 70 μm, a width of 100 to 300 μm, and an aspect ratio of 1.4 to 30 are suitable ranges. The thickness of the spring plate reinforcing member, when such a spring plate reinforcing member is required, is preferably the same as the thickness of the spring plate to be joined to the spring plate reinforcing member. It is needless to say that even if the spring plate in such a range of thickness is used, the spring plate is preferably within the mass ratio range of the spring plate and the diaphragm described above.

For the piezoelectric film in the piezoelectric element used as main and subsidiary elements, although film-like piezoelectric ceramics are suitably used, electrostrictive ceramics or ferroelectric ceramics may also be used. Such materials may be either those requiring or not requiring polarization.

Ceramics that can be used in the piezoelectric film include, for example, lead zirconate, lead titanate, lead magnesium niobate, lead nickel niobate, lead zinc niobate, lead manganese niobate, lead antimony stannate, lead manganese tungstate, lead cobalt niobate, and barium titanate. These may be used alone, or as ceramics containing the combination of some of them. In the present invention, a material containing the components consisting mainly of lead zirconate, lead titanate, and lead magnesium niobate as the main component is preferably used, because such a material not only has high electromechanical coupling factor and piezoelectric constant, but also has small reactivity with the sensor substrate member on sintering piezoelectric film, and can form the desired composition stably.

Furthermore, ceramics containing the oxides of lanthanum, calcium, strontium, molybdenum, tungsten, barium, niobium, zinc, nickel, manganese, cerium, cadmium, chromium, cobalt, antimony, iron, yttrium, tantalum, lithium, bismuth, and tin alone, or in the combination of some of these oxides, or ceramics in which other compounds of these elements are added may be used for the above piezoelectric ceramics. For example, a ceramic material containing lead zirconate, lead titanate, and lead magnesium niobate as main components, to which lanthanum or strontium is added is also preferable, and such a material to which manganese is further added is preferable because the mechanical quality factor is large, and the Q value can be increased not only from the structure of the sensor but also from the material.

On the other hand, the first electrode and the second electrode in the piezoelectric element are preferably formed from a metal that is solid at room temperature and conductive. For example, a metal such as aluminum, titanium, chromium, iron, cobalt, nickel, copper, zinc, niobium, molybdenum, ruthenium, palladium, rhodium, silver, tin, tantalum, tungsten, iridium, platinum, gold, or lead alone, or an alloy of some of these elements can be used. Furthermore, a cermet material in which the same material used in the piezoelectric film or the sensing plate is dispersed in these materials may be used. These metal materials may be used as the materials of the electrode for the position sensor.

The selection of the material for the actual first electrode and the second electrode is determined depending on the method for forming the piezoelectric film. For example, when the first electrode is formed on the sensing plate, then the piezoelectric film is formed on the first electrode by sintering, the first electrode must be made of a metal having high melting point, such as platinum, which is not affected by the temperature for sintering the piezoelectric film. However, since the second electrode formed on the piezoelectric film after forming the piezoelectric film can be formed at a low temperature, a metal having low melting point, such as aluminum, can be used.

Although the piezoelectric element can be integrally formed by sintering, in this case, both the first electrode and the second electrode must be made of a metal having high melting point which resists the temperature for sintering the piezoelectric film. On the other hand, when the first and second electrodes 97, 98 are formed on the piezoelectric film 96 as shown in FIG. 5, both electrodes can be made of the same metal having low melting point. Thus, the materials for the first electrode and the second electrode can be selected suitably depending on the temperature for forming the piezoelectric film represented by the sintering temperature of the piezoelectric film and the structure of the piezoelectric element.

Since a problem arises when the area of the piezoelectric element is expanded, in that although sensitivity increases because of increase in the output charge, the size of the sensor increases, the piezoelectric element should be designed to an adequate shape. Also, since a problem arises when the thickness of the piezoelectric element is decreased, in that although sensitivity increases, the rigidity of the piezoelectric element is lowered, the total thickness of the sensing plate and the piezoelectric element is preferably 15 to 50 μm.

When an insulation coating layer is formed on the main element, the subsidiary elements, and the electrode leads as in the double-headed mass sensor 40D shown in FIG. 15, insulating glass or resin is used as its material. For enhancing the performance of the double-headed mass sensor, a resin is more preferably used as the material for the insulation coating layer than glass, and chemically stable fluorocarbon resins, for example, tetrafluoroethylene-based Teflon (Teflon PTFE of DuPont K.K.), tetrafluoroethylene-hexafluoropropylene copolymer-based Teflon (Teflon FEP), tetrafluoroethylene-perfluoroalkyl vinyl ether copolymer-based Teflon (Teflon PFA), and PTFE/PFA composite Teflon are preferably used. Although corrosion resistance and weather resistance are lower than those of these fluorocarbon resins, silicone resins (in particular, thermosetting silicone resins) can be suitably used, and epoxy resins or acrylic resins can also be used depending on the applications. It is also preferable to add inorganic or organic fillers in the insulating resin to adjust the rigidity of the resonating portion.

When the insulation coating layer is formed, the materials for a shield layer formed on the insulation coating layer are preferably metals such as gold, silver, copper, nickel, and aluminum; however, any metallic materials used in the first electrode of the piezoelectric element or the like described above can be used. A conductive paste comprising metal powder mixed in a resin may also be used. It is also preferable to form the insulation coating layers using the materials in the main element, the subsidiary elements, and the vicinity thereof, different from the material used in the electrode leads and the vicinity thereof Next, a method for fabricating a double-headed mass sensor will be described using as an example the double-headed mass sensor 55 having a cross section shown in FIG. 11(e), that is a double-headed mass sensor having the structure in the double-headed mass sensor 40A shown in FIG. 2(a) in which a spring plate 47 is provided only on a side of each of the connecting plates 22A, 22B. As the materials of the sensor substrate 27, ceramics such as zirconia are suitably used. A slurry is produced by mixing a binder, solvent, dispersant, and other additives in ceramic powder, and after removing foams from the slurry, a green sheet or a green tape for the vibrating plates, intermediate plates and base plates having desired thickness using a method such as the reverse roll coater method and the doctor blade method is formed.

Next, these green sheets are punched using a die or laser to desired shapes, for example, as shown in FIG. 19, the shape of an intermediate plate 64 having an opening 67 and a spring plate 68, and the shape of a base plate 66 having an opening 67, and the green sheet at least one for each of the vibration plate 63, the intermediate plate 64, and the base plate 66 are laminated in this order under applying a heat and pressure, sintered, and integrated to form the sensor substrate 27.

Figures 11B, 11C, 11D, 11E:
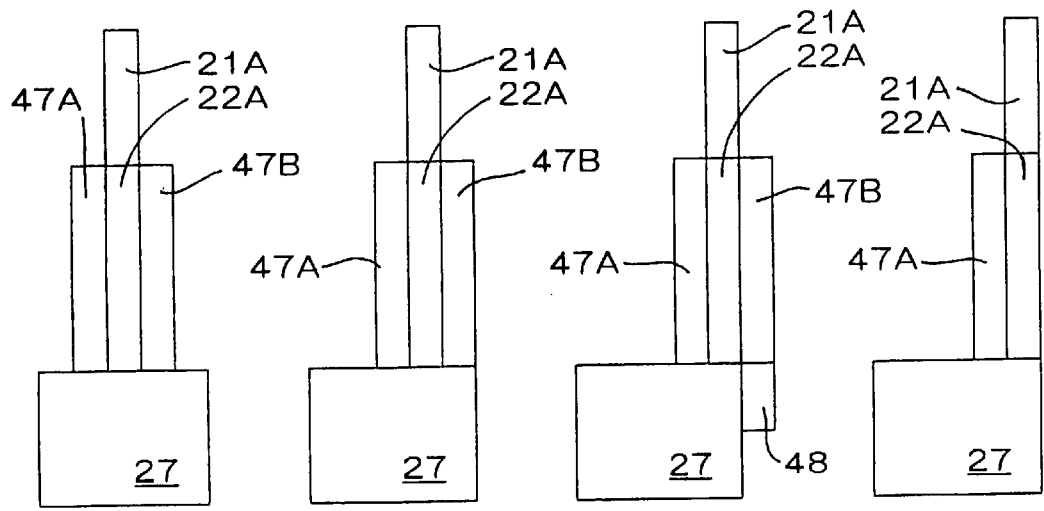

It is also possible to form the vibrating plate 63 as shown in FIG. 11(b) on the center of the sensor substrate by sandwiching the vibrating plate 63 with two intermediate plates 64, and further sandwiching it with two base plates 66. If two openings 67 are formed in the sensor substrate 27, and a resonating portion is formed in each of the openings 67, it becomes easy to use one of the resonating portions as the sensor for measurement, and the other for reference.

Here, on laminating these green sheets, holes 69 are formed in each green sheet for the alignment of lamination. Although an outer frame produced by punching the rectangular plane inner portion as the shape of the base plate 66 is used for the sensor substrate 27, a concave portion may be later formed by cutting in the sensor substrate 27 for fitting the resonating portion of the double-headed mass sensor 55, or the shape may be maintained for forming the structure in which each of the diaphragms 21A, 21B and the like are formed inside the sensor substrate 27. Although the area which becomes the opening 67 or the diaphragms 21A, 21B and the like can be formed in the green state, since the vibrating plate 63 is as thin as 20 $\mu$m or less, it is preferable to form the predetermined shapes after forming the sensor substrate 27 and the main and subsidiary elements 44, 42A, 42B by laser processing described later, for securing the flatness and dimensional accuracy after sintering of the diaphragms 21A, 21B, connecting plates 22A, 22B, and sensing plates 41A, 41B, 41C formed in the vibrating plate 63.

Methods for forming on the area of the vibrating plate 63 where the sensing plates 41A, 41B, 41C are formed the piezoelectric elements, which are the main and subsidiary elements 44, 42A, 42B consisting of a first electrode, a piezoelectric film, and a second electrode, include a method in which a piezoelectric film is formed by press formation using a die or tape formation using a slurry material, the piezoelectric film before sintering is laminated under applying a heat and pressure on the area of the vibrating plate 63 where the sensing plates 41A, 41B, 41C are formed, and they are simultaneously sintered (co-fired) to form the sensor substrate 27 and the piezoelectric element at the same time. In this case, however, the electrodes must be formed on the sensor substrate 27 or on the piezoelectric film beforehand by the film formation method described later.

Although the temperature for sintering the piezoelectric film is determined depending on the constituting material, it is generally 800° C. to 1400° C., preferably 1000° C. to 1400° C. In this case, it is preferable for controlling the composition of the piezoelectric film, that sintering is conducted in the presence of the evaporation source of the material for the piezoelectric film. When the sintering of the piezoelectric film and the sintering of plates 63–65 are performed simultaneously, the sintering conditions of the two must be matched to each other.

On the other hand, if the film formation method is used, the piezoelectric element can be formed on the area of the vibrating plate 63 on which the sensing plates 41A, 41B, 41C are formed, by various thick film forming methods, such as screen printing, dipping, and painting; or various thin film forming methods, such as the ion beam method, sputtering, vacuum deposition, ion plating, chemical vapor deposition (CVD), or electroplating. Among these, for the formation of the piezoelectric film in the present invention, thick film forming methods, such as screen printing, dipping, and painting are preferably used. This is because the piezoelectric film can be easily formed using paste or slurry consisting mainly of the particles of piezoelectric ceramics having an average particle size of 0.01 to 5 $\mu$m, preferably 0.05 to 3 $\mu$m, and favorable piezoelectric properties can be obtained.

For example, after the sensor substrate 27 has been sintered under predetermined conditions, the first electrode is printed and sintered on the predetermined surface area of the vibrating plate 63, then the piezoelectric film is printed and sintered, and further, the second electrode is printed and sintered to form the piezoelectric element. Then, electrode leads are printed and sintered for connecting the formed electrodes to the measuring instruments. Here, for example, if platinum (Pt) is used for the first electrode, lead zirconate titanate (PZT) is used for the piezoelectric film, gold (Au) is used for the second electrode, and silver (Ag) or the like is used for the electrode leads, sintering temperatures in the sintering process can be lowered stepwise. Therefore, the previously sintered materials are re-sintered in a certain sintering step, and the occurrence of troubles in the material for electrodes and the like, such as peeling off and agglomeration or condensation, can be avoided.

By selecting suitable materials, the respective members and electrode leads of the piezoelectric element can be printed one after the other, and integrally sintered at once, or after the piezoelectric film is formed, respective electrodes and the like can be provided at a low temperature. Also, the respective members and electrode leads of the piezoelectric element can be formed by a thin film forming method, such as sputtering or vapor deposition. In this case, heat treatment is not necessarily required. Furthermore, the electrode for the position sensor can be formed simultaneously with the formation of the electrode leads.

Thus, by forming the piezoelectric element using the film formation method, since the piezoelectric element and the sensing plates 41A, 41B, 41C can be integrally joined without using adhesives, and the double-headed mass sensor excels in reliability and reproducibility, and is easily integrated. Here, the piezoelectric film may be suitably patterned, and the methods for patterning include, for example, screen printing, photolithography, laser processing, or mechanical processing such as slicing and ultrasonic processing.

Next, diaphragms 21A, 21B are formed on the predetermined area of thus formed sensor substrate 27. Here, it is preferable to remove the unnecessary part of the sintered vibrating plate 63 by processing using the fourth harmonic (wave) of YAG laser. Thus, an opening 67 can be formed leaving members integrally joined to the sensor substrate 27, such as the diaphragms 21A, 21B, and the sensing plates 41A, 41B, 41C as shown in FIG. 2, and at this time, by adjusting the shape of each of the diaphragms 21A, 21B and the like, the resonant frequency can be adjusted to the predetermined value, and the range of masses of the substance to be sensed can be determined.

Here, as shown in FIG. 20, if a part of each of the diaphragms 21A, 21B is cut and removed so that the length of the each of the diaphragms 21A, 21B is decreased from $L_0$ to $L_1$, the resonance point can be raised, and on the other hand, if the width of each of the connecting plates 22A, 22B (and the spring plate) is narrowed from $t_0$ to $t_1$, the resonance point can be lowered. Therefore, by the combination of these values, the resonance point can be adjusted. Furthermore, by narrowing the width of the each of the diaphragms 21A, 21B from $W_0$ to $W_1$, the rotational mode can be restricted, the Q value in the $\theta$-mode can be increased, and the difference of change in the resonant frequencies depending on an adhesion location can be decreased even when change in the mass of the adhered substance is the same.

Furthermore, when a piezoelectric element of a lamination type as FIG. 4 shows is provided, as shown in FIG. 21, it is preferable that after a piezoelectric element comprising a first electrode 90 as the lower electrode, a second electrode 92 as the upper electrode, and a piezoelectric film 91 formed in between is once formed, then the upper electrode is removed by the fourth harmonic wave of YAG laser, or machining to adjust the available electrode area of the piezoelectric element and adjust detection sensitivity. When the structure of the piezoelectric element is a comb-shaped structure as shown in FIG. 6 or 7, part of one or both electrodes may be removed.

In processing such a sensor portion, there can be used various processing methods suitable for the size and shape of the sensor portion, such as laser processing with YAG laser, the second or third harmonic wave of YAG laser, excimer laser, or $CO_2$ laser; electron beam processing; and dicing (machining), in addition to the fourth harmonic wave of YAG laser described above.

In addition to the method using green sheets as described above, the sensor substrate 27 can be produced by the compression method, casting method, or injection method using molds. In these cases also, machining such as cutting, grinding, laser processing, punching, and ultrasonic processing is conducted before and after sintering, and the double-headed mass sensor 55 of a predetermined shape can be obtained.

When an insulation coating layer 77 is formed on the main and subsidiary elements 44, 42A, 42B, and electrode leads in thus fabricated double-headed mass sensor 55, as in the double-headed mass sensor 40D shown in FIG. 15, it can be formed using glass or a resin by screen printing, coating, or spraying. Here, when glass is used as the material, the double-headed mass sensor 55 itself must be heated to near the softening point of the glass, and since glass has a high hardness, oscillation may be inhibited. However, since the resin is soft, and only such processing as drying is required, the use of a resin is preferable. Although it has already been described that fluorocarbon or silicone resins are suitable as resins that can be used in the insulation coating layer 77, it is preferable, when these resins are used, to form a primer layer suited to the types of the resin and ceramics used, for improving the adhesion with the underlying ceramics, and to form the insulation coating layer 77 on the primer layer.

Next, when a shield layer 78 is formed on the insulation coating layer 77 made of a resin, since sintering is difficult, a method not requiring heat, such as sputtering, is used when various metallic materials are used as conductive members; however, when a conductive paste comprising metal powder and a resin, screen printing or coating can be used preferably. If the insulation coating layer 77 is made of glass, a paste containing a metal can be screen-printed, and fired below a temperature at which the glass flow.

Finally, a double-headed mass sensor is completed by applying a catching substance such as an antibody to each of the diaphragms 21A, 21B. Here, when a plurality of openings 67 are provided, and two of them are formed for measurement and for reference in the sensor substrate 27, respectively, it is preferable that these two sensors are provided in the vertical (up-down) direction of the sensor substrate 27, that is, in the location where the sensor for sensing is first immersed in a liquid or the like, and the sensor for reference is not immersed in the liquid or the like, because it is easy that only the sensor portion for sensing is immersed in the catching substance for applying the catching substance to the diaphragm of the immersed portion of the diaphragm or the like, while the sensor for reference is used as a sensor such as a temperature compensation sensor without Teflon coating or the like, and is not immersed in the catching substance not to apply the catching substance to the diaphragm. In the double-headed mass sensor, it is preferable that at least two resonating portions are provided on a sensor substrate, and one of the resonating portions is used as the resonating portion for reference without applying the catching substance to the diaphragm. On the other hand, it is also preferable to apply different types of catching substances to each of the resonating portions, that is to provide in a sensor a plurality of resonating portions to which two or more different catching substances are separately applied.

Thus, a double-headed mass sensor in which a catching substance is applied only to the sensor for sensing can be easily fabricated. However, in actual mass measurement using such a double-headed mass sensor, each of the sensors for sensing and reference must be placed in the same environment. When the double-headed mass sensor of the present invention is entirely immersed in a conductive liquid, it is needless to say that the provided piezoelectric element and the electrode leads must be coated with an insulation coating layer. As described above, in the using method in which two sensors are used for sensing and reference, respectively, Teflon coating on the resonating portion in the sensor for reference, that is, the diaphragm, the connecting plate, the sensing plate, the piezoelectric element, the spring plate, and the like prevents the substance to be sensed from adhering on the sensor for reference and the like, and enables more accurate measurement. Similarly, Teflon coating on the part of the sensor for sensing other than the diaphragm is preferred, because the substance to be sensed can be securely caught by only the diaphragm, and sensitivity is improved. Furthermore, since an expensive catching substance, such as antibodies, is applied only to the required area, the coating to the entire sensor substrate 2 other than the diaphragm is preferred from the point of view of the costs.

It is also possible to increase the dynamic range by applying the same catching substance to each diaphragm of each sensor, and integrating signals from each sensor. Furthermore, it is possible to use the sensor for reference not for reference but to use it by applying a catching substance different from that applied to the sensor for sensing, By the use of the fabricated double-headed mass sensor, the measurement as an impedance analyzer or a network analyzer can be conducted, and by sensing the voltage and charge from the piezoelectric element (main and subsidiary elements 44, 42A, 42B) and measuring resonant frequencies using the transfer function measurement with the SINSWEEP method, change in the mass of the diaphragm can be measured. When the main element or the subsidiary elements are divided, resonant frequencies are measured by the method in which SINSWEEP waves are supplied to the driving element (exciting element), and the sensing element (receiving element) senses output charge or output voltage with a spectrum analyzer. All of the double-headed mass sensors of the present invention can be fabricated by the method described above, and can be used for measuring resonant frequencies.

Next, other applications of the double-headed mass sensor according to the present invention will be described. First, when the catching substance applied to the diaphragm is a moisture adsorbing material, the double-headed mass sensor can be used as a moisture meter. When applying to the diaphragm an adsorbing material that adsorbs a specific gaseous component, or an organic or inorganic substance as a catching substance, the double-headed mass sensor can be used as a gas sensor, an odor sensor, or a taste sensor. Furthermore, if the temperature of the diaphragm is controlled to make dew condense, the double-headed mass sensor can be used as a dew indicator which measures the dew point from the temperature when the mass of the diaphragm is increased.

The double-headed mass sensor can also be used as a film thickness meter. The films that can be measured include sputtered films or CVD films formed in vacuum, LB films formed in gases, or electrodeposited films formed in liquids. When these films are formed, if the diaphragm of the double-headed mass sensor is placed in the same film forming environment, a film is formed on the diaphragm causing change in the mass, and change in resonant frequency, the thickness or the growing speed of the formed film can be measured.

Although a quartz vapor-deposited film thickness meter has been known to detect change in the resonant frequency of a quartz oscillator similar to the one shown in FIG. 22 in the shear mode when the film thickness changes, it has problems in that it is largely affected by change in temperature, noise due to the collision of impurities, and change in vacuum pressure, because the oscillator itself is used in a vapor deposition environment.

Whereas, if the double-headed mass sensor is used in the θ-mode or the η-mode as a vapor-deposited film thickness meter, the sensing portion consisting of a sensing plate and main and subsidiary elements resists change in temperature because of the rigid-body mode, the probability of the collision of impurities is low because the diaphragm is as thin as 3 to 20 μm, and a structure in which the sensing portion, spring plate, and the connecting plate are easily held in a constant environment, the measurement accuracy can be improved compared with the case where a quartz oscillator is used.

Furthermore, the double-headed mass sensor can be used as a viscosity meter to cause the shear waves of transverse waves to occur in a fluid when the diaphragm is immersed in the liquid, and receive the mass load of the portion where viscous waves enter.

Although a quartz viscosity meter for detecting change in the resonant frequency of a quartz oscillator in the shear mode has also been used, it has problems in that it is susceptible to change in temperature, and noise due to the collision of impurities in the liquid, because the quartz oscillator itself is immersed in the liquid. On the other hand, when the double-headed mass sensor is used in the θ-mode as a viscosity meter, since the sensing portion 29, the spring plate 18, and the connecting plate 20 are not required to immerse in the liquid, the sensing portion 29 resists change in temperature because of the rigid-body mode, and the diaphragm 19 is as thin as 3 to 20 μm, the probability of the collision of impurities is low, measurement accuracy is improved.

Furthermore, a quartz oscillator is used as a friction vacuum gauge since its electric resistance varies due to the friction of gas molecules and the viscous friction of the gas in a vacuum. However, since this type of vacuum gauge is used to measure change in frequencies due to the mass load effect of the quartz oscillator, the double-headed mass sensor utilizing basically the same measurement principle can also be used as a vacuum gauge.

Although a friction vacuum gauge using a quartz oscillator detects change in resistance when the tuning fork-shaped oscillator 79 is oscillated in the X-axis direction as FIG. 23 shows, it is difficult to decrease the thickness $d_1$ of the oscillator 79, and therefore, the improvement of detection sensitivity is difficult. Whereas, in the double-headed mass sensor, the thickness of the diaphragm can be decreased to 3 to 20 μm, and the θ-mode or the η-mode can be used, detection sensitivity can be improved.

In addition, the double-headed mass sensors 25 and the like, 60, and 65 can be used as a temperature sensor by using the bending mode of the diaphragm, that is, by sensing change in the Young's modulus as change in resonant frequency in the bending mode.

Although the double-headed mass sensor of the present invention can be used as various sensors, the basic principle of measurement is to measure change in the resonant frequency of the resonating portion on the basis of the mass load to the diaphragm. Therefore, a plurality of sensors having different functions can be easily formed in one double-headed mass sensor, that is, by providing a plurality of openings in the sensor substrate, sensors having different functions can be easily provided in each of the openings. For example, the functions of a temperature sensor, a vacuum gauge, or a viscosity sensor can be incorporated to the double-headed mass sensor, and the compensation of temperature, vacuum, or viscosity can be easily performed for the mass measurement. In such cases, since the use of a plurality of sensors having different shapes for different applications is not required, it is also advantageous from the costs for the incorporation of sensors to the place of measurement and their handling, and for the installation of measuring instruments.

The double-headed mass sensor of the present invention has been described above focussing a piezoelectric transducer using a piezoelectric film that utilizes the piezoelectric effect as a device for sensing the oscillation of a resonating portion and converting the vibration to electric signals. However, such signal converters of vibration are not limited to those utilizing the piezoelectric effect, but may be constituted by those utilizing electromagnetic induction, change in electrostatic capacity, change in incident light, change in electric resistance, or pyroelectricity.

For example, those utilizing electromagnetic induction include those having a coil installed on the sensing plate, an electric circuit for detecting electric signals flowing in the coil, and a magnet (may be an electromagnet) for generating a magnetic field in the coil. In this case, when the coil oscillates together with the resonating portion, an electric current flows through the coil due to electromagnetic induction, and the electric current is detected by the electric circuit. Also, those utilizing change in electrostatic capacity include those having a pair of electrodes installed on the surface of the sensing plate, a dielectric sandwiched by these electrodes, and an electronic circuit connected to these electrodes, and detecting the electrostatic capacity charged in this specific space with the electronic circuit.

Those utilizing change in incident light include those having a device for illuminating the resonating portion such as a photodiode and a device for measuring the quantity of light reflected by the resonating portion (light receiver). This light receiver may be a photosensor. As the resonating portion vibrates, the quantity of light reflected by the resonating portion changes, and change in the quantity of the incident light is measured by the light receiver.

Those utilizing change in electric resistance are roughly divided into that using a conductor and that using a semiconductor. That using a conductor has a conductor provided on the surface of the resonating portion, and an electric circuit connected to the conductor. Since the conductor is distorted by vibration when the conductor oscillates together with the resonating portion and its resistance changes, this change in resistance is detected by the electric circuit. That using a semiconductor uses a semiconductor in place of the conductor.

Those utilizing pyroelectricity include those comprising a pair of electrodes provided on the surface of the sensing plate, a pyroelectric material formed between these electrodes, an electronic circuit connected to the electrodes, and a heat source, and detecting pyroelectric current generated by oscillation with the electronic circuit.

These types of signal converters of vibration can be used in place of the piezoelectric elements described above, and in addition, different signal converters can be used for the excitation of the resonating portion and for receiving the oscillation from the resonating portion separately. For example, a piezoelectric transducer can be used for exciting, and an electrostatic capacity-type converter for receiving. The arrangement of exciting and receiving devices can be selected suitably and conveniently depending on the number of sensing plates. For example, when only one sensing plate is used, they can be arranged on the surface of the sensing plate; when two sensing plates are used, they can be arranged on both surfaces of the two, or on each surface.

Industrial Applicability

As described above, a double-headed mass sensor of the present invention exhibits excellent effects in that change in various extremely small masses occurring in a resonating portion, particularly on a diaphragm, that is, change in mass load on the diaphragm, can be sensed easily and accurately in a short time. Also, since such change in the mass is not limited to that of the diaphragm, but resonant frequencies are changed by change in the mass occurring in the resonating portion, the location where change in the mass occurs can be selected depending on the uses. Therefore, when a catching substance for catching various substances to be sensed is applied to the resonating portion, the double-headed mass sensor can be used as a gas sensor, taste sensor, odor sensor, immunosensor, or moisture sensor, which can sense various chemical substances or microorganisms such as bacteria and viruses. On the other hand, when such a catching substance is not applied to the resonating portion, the double-headed mass sensor can be used as a film-thickness meter, a viscosity meter, a vacuum gauge, a thermometer, or the like. Moreover, when the double-headed mass sensor is used as an immunosensor, an odor sensor, or a taste sensor, the reliability of tests can be improved, because determination does not rely on human sense.

Also, since the double-headed mass sensor of the present invention is little affected by the temperature of the specimen or change in the properties of materials for the double-headed mass sensor itself due to the temperature of the specimen on sensing resonant frequencies, and can measure an extremely small quantity of a 0.1 nanogram (ng) order as the nature of its structure, it exhibits the effect for sensing an extremely small quantity of substance.

Furthermore, although the double-headed mass sensor of the present invention can be used for various applications as described above, since measurement is performed on the basis of fundamental measurement principle in which change in resonant frequencies of the resonating portion including the diaphragm subjected to mass load is measured, a plurality of sensor portions having different functions can be provided in a double-headed mass sensor easily. Therefore, since the use of a plurality of various discrete sensors is not required, the mass sensor of the present invention also excels in economic effects in the reduction of costs for incorporating the sensor in the measuring location, for facilities for handling or measuring such as measuring instruments, as well as the reduction of costs by the integration and the shared use of manufacturing equipment.

What is claimed is:

1. A double-headed mass sensor, comprising:

a resonating portion, said resonating portion comprising a first connecting plate, a first diaphragm, a second connecting plate, a second diaphragm, and a first sensing plate;

said first diaphragm being joined to said first connecting plate in a first direction;

said second diaphragm being joined to said second connecting plate in a second direction, said second direction being substantially parallel to said first direction;

said first sensing plate bridging between said first connecting plate and said second connecting plate in a direction perpendicular to said first and second directions;

a main element provided on a surface of said first sensing plate; and a sensor substrate, at least a portion of each said first and second connecting plates being joined to said sensor substrate.

2. The double-headed mass sensor according to claim 1 characterized in that said main element is split in the direction perpendicular to the joining direction of said first sensing plate and each of said first and second connecting plates.

3. The double-headed mass sensor according to claim 1 characterized in that a direction of an extension of a center line equally dividing said surface of said first sensing plate and perpendicular to a joining direction of said first sensing plate and each of said connecting plates is parallel to a joining direction of said first connecting plate and said first diaphragm, and a joining direction of said second connecting plate and said second diaphragm, and said resonating portion is symmetrical about said center line.

4. The double-headed mass sensor according to claim 1 characterized in that a position sensor consisting of a pair of electrodes on said sensor substrate is provided at a central position between each of said diaphragms and said main element.

5. The double-headed mass sensor according to claim 1 characterized in that, said main element is a piezoelectric element consisting of at least a first electrode, a second electrode, and a piezoelectric film, said piezoelectric element has a laminated structure in which said piezoelectric film is sandwiched between said first electrode and said second electrode, or a structure in which a comb-shaped electrode consisting of said first electrode and said second electrode face each other on a plane surface of said piezoelectric film or between said piezoelectric film and said first sensing plate on which said piezoelectric film is provided, or a structure in which said piezoelectric film is provided in a gap between said first electrode and said second electrode forming a comb-shaped electrode.

6. The double-headed mass sensor according to claim 5 characterized in that said piezoelectric film is formed from a material consisting mainly of lead zirconate, lead titanate, and lead magnesium niobate.

7. The double-headed mass sensor according to claim 5 characterized in that an available electrode area of said piezoelectric element is adjusted by removing a part of said first electrode and/or said second electrode with laser processing or machining.

8. The double-headed mass sensor according to claim 1 characterized in that each of said diaphragms, each of said connecting plates, and said sensing plate have surfaces which form a plane surface through which they are joined to each other.

9. The double-headed mass sensor according to claim 1 characterized in that said sensing plate is fitted in and joined to concave portions formed by each of said connecting plates and said sensor substrate.

10. The double-headed mass sensor according to claim 1 characterized in that each of said diaphragms, each of said connecting plates, and said sensing plate are integrally formed from a vibrating plate, and said sensor substrate is integrally formed by laminating said vibrating plate and a base plate.

11. The double-headed mass sensor according to claim 1, further comprising spring plates joined to one or more plane surfaces of each of said connecting plates, and each of said spring plates is joined to said sensor substrate or a spring plate reinforcing member.

12. The double-headed mass sensor according to claim 11, characterized in that each of said connecting plates and said sensing plate are integrally formed from a vibrating plate, said sensor substrate is integrally formed by laminating said vibrating plate and a base plate, each of said spring plates is integrally formed with an intermediate plate which is integrally fitted between said vibrating plate and said base plate, or said reinforcing member is integral with said vibrating plate and each of said spring plates is integrally formed with said spring plate reinforcing member and integrally with a respective one of said connecting plates.

13. The double-headed mass sensor according to claim 11, further comprising a reinforcing plate joined to each of said spring plates, and joined to said sensor substrate.

14. The double-headed mass sensor according to claim 13 characterized in that said reinforcing plate is formed integrally with each of said spring plates and said sensor substrate.

15. The double-headed mass sensor according to claim 1 characterized in that a catching substance, which reacts only with a substance to be sensed and catches said substance to be sensed, is applied to a surface of at least one of said first diaphragm and said second diaphragm, or to at least a part of a surface of said resonating portion.

16. The double-headed mass sensor according to claim 1 characterized in that said main element is insulated by an insulation coating layer consisting of a resin or glass.

17. The double-headed mass sensor according to claim 16 characterized in that said resin is fluorocarbon resin or a silicon resin.

18. The double-headed mass sensor according to claim 16 characterized in that at least a part of a surface of said insulation coating layer is coated by a shield layer consisting of a conductive material.

19. The double-headed mass sensor according to claim 1, said mass sensor further comprising spring plates joined to one or more planed surfaces of said connecting plates, each of said spring plates being joined to said sensor substrate, characterized in that said sensor substrate, each of said diaphragms, each of said connecting plates, said first sensing plate, and each of said spring plates are comprised of stabilized zirconia or partially stabilized zirconia.

20. The double-headed mass sensor according to claim 1, said mass sensor further comprising spring plates joined to one or more planed surfaces of each of said connecting plates, characterized in that shapes of at least some of said diaphragms, said connecting plates, said sensing plate, and said spring plates are dimensionally adjusted by trimming with laser processing or machining.

21. A double-headed mass sensor, comprising:

a sensor substrate;

a first diaphragm joined to said sensor substrate along a first direction by a first connecting plate;

a second diaphragm joined to said sensor substrate along a second direction by a second connecting plate, said second direction being substantially parallel to said first direction;

a sensing plate joining said first and second connecting plates to one another in a third direction substantially perpendicular to said first and second directions; and a main element provided on at least one plane of said sensing plate;

wherein at least said connecting plates, said diaphragms, said sensing plate and said main element define a resonating portion.

* * * * *